(12) United States Patent
Oya et al.

(10) Patent No.: US 7,116,357 B1
(45) Date of Patent: Oct. 3, 2006

(54) CAMERA MONITORING SYSTEM

(75) Inventors: Takashi Oya, Yokohama (JP); Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 08/615,876

(22) Filed: Mar. 14, 1996

(30) Foreign Application Priority Data

Mar. 20, 1995 (JP) .............................................. 7-061057
Jun. 12, 1995 (JP) .............................................. 7-144460

(51) Int. Cl.
*H04N 5/232* (2006.01)

(52) U.S. Cl. ..................................... 348/211.8; 348/143
(58) Field of Classification Search ................ 348/143, 348/142, 139, 705, 159, 156, 211.99, 207.11, 348/15, 211
See application file for complete search history.

(56) References Cited

U.S. PATENT DOCUMENTS

| | | | | |
|---|---|---|---|---|
| 4,037,250 A | * | 7/1977 | McGahan et al. | 348/159 |
| 4,507,683 A | * | 3/1985 | Griesshaber et al. | 348/211 |
| 4,516,156 A | | 5/1985 | Fabris et al. | |
| 4,527,201 A | * | 7/1985 | Cappels | 348/347 |
| 4,989,085 A | | 1/1991 | Elberbaum | |
| 4,992,866 A | * | 2/1991 | Morgan | 358/108 |
| 5,111,288 A | * | 5/1992 | Blackshear | 348/143 |
| 5,182,641 A | | 1/1993 | Diner et al. | |
| 5,237,408 A | * | 8/1993 | Blum et al. | 348/154 |
| 5,241,379 A | * | 8/1993 | Tsujita | 348/211 |
| 5,258,837 A | * | 11/1993 | Gormley | 348/211 |
| 5,396,287 A | * | 3/1995 | Cho | 348/211 |
| 5,412,708 A | * | 5/1995 | Katz | 348/14 |
| 5,479,206 A | | 12/1995 | Ueno et al. | |
| 5,508,737 A | * | 4/1996 | Lang | 348/705 |
| 5,652,849 A | | 7/1997 | Conway et al. | |
| 5,657,246 A | | 8/1997 | Hogan et al. | |
| 5,757,418 A | | 5/1998 | Inagaki | |
| 5,825,432 A | | 10/1998 | Yonezawa | |
| 5,872,594 A | * | 2/1999 | Thompson | 348/213 |
| 6,002,995 A | | 12/1999 | Suzuki et al. | |
| 6,380,972 B1 | * | 4/2002 | Suga et al. | 348/211 |

FOREIGN PATENT DOCUMENTS

| | | |
|---|---|---|
| EP | 0 513 601 A1 | 11/1992 |
| EP | 0513601 | * 11/1992 |
| JP | 02-110439 | 4/1990 |
| JP | A 5-274573 | 10/1993 |
| JP | A 6-284330 | 10/1994 |
| WO | WO 94/24813 | 10/1994 |

OTHER PUBLICATIONS

Form PTO–892 dated Apr. 9, 1999, cited in related Appl. No. 08/563,703.

N. Thouvenot, "Urban Video Surveillance System," 1225 Electrical Communication, p. 143–147, Published 2nd Quarter 1994.

* cited by examiner

*Primary Examiner*—Vivek Srivastava
(74) *Attorney, Agent, or Firm*—Morgan & Finnegan, L.L.P.

(57) ABSTRACT

A camera control system having a plurality of cameras connected to a network, enabling users to be informed of such as status of use of each camera and each user's access right in a real-time manner. The system, where one of cameras controllable via the network is selected and video-display of output from the selected camera and operation of the camera are controlled, has camera-status display device for real-time displaying the statuses of at least two cameras.

69 Claims, 22 Drawing Sheets

FIG. 4

| CAMERA | POSITION (x, y, z) | INITIAL DIRECTION (PAN ANGLE, TILT ANGLE) |
|---|---|---|
| CAMERA 1-1 | (250 , 30 , 120) | (50 , 10) |
| CAMERA 1-2 | (50 , 30 , 100) | (20 , 25) |
| CAMERA 1-3 | (160 , 30 , 90) | (-10 , -5) |
| ------- | ------------- | ---------- |

FIG. 9

| LAYOUT INFORMATION (ID) | FLOOR | BITMAP FILE NAME | BITMAP SIZE |
|---|---|---|---|
| 001 | A-26F | a26f.bmf | 350 × 200 |
| 002 | A-19F | a19f.bmf | 400 × 250 |
| 003 | B-3F | b3f.bmf | 380 × 200 |
| ---- | ---- | ------- | ------- |

FIG. 10

| CAMERA | FLOOR | POSITION (x, y, z) | INITIAL DIRECTION (PAN ANGLE, TILT ANGLE) |
|---|---|---|---|
| CAMERA 1-1 | A-26F | (250, 30, 120) | (50, 10) |
| CAMERA 1-2 | A-26F | (50, 30, 100) | (20, 25) |
| CAMERA 1-3 | A-3F | (160, 30, 90) | (-10, -5) |
| ------- | ----- | -------------- | --------- |

FIG. 16

| CAMERA | FLOOR | POSITION (x, y, z) | PAN ANGLE, TILT ANGLE, ZOOM | USER |
|---|---|---|---|---|
| CAMERA 1-1 | A-26F | (250, 30, 120) | (50, 10, 30) | USER 1 |
| CAMERA 1-2 | A-26F | (50, 30, 100) | (20, 25, 0) | NOBODY |
| CAMERA 2-1 | A-3F | (160, 30, 90) | (-10, -5, 0) | NOBODY |
| CAMERA 3-1 | B-10F | (420, 30, 130) | (30, 0, 15) | USER 2 |
| CAMERA 3-2 | B-10F | (500, 30, 110) | (-15, 15, 50) | NOBODY |
| ------- | ------ | ---------- | --------- | -------- |

| CAMERA | FLOOR | POSITION (x, y, z) | INITIAL ATTITUDE (PAN ANGLE, TILT ANGLE) |
|---|---|---|---|
| CAMERA 1-1 | A-26F | (250, 30, 120) | (50, 10) |
| CAMERA 1-2 | A-26F | (50, 30, 100) | (20, 25) |
| CAMERA 1-3 | A-3F | (160, 30, 90) | (-10, -5) |
| ------ | ----- | ------------ | -------- |

FIG. 19

| CAMERA | HOST | FLOOR | POSITION (x, y, z) | PAN ANGLE, TILT ANGLE, ZOOM | USER | OTHERS |
|---|---|---|---|---|---|---|
| CAMERA 1-1 | HOST 1 | A-26F | (250, 30, 120) | (50, 10, 30) | USER 1 | ------ |
| CAMERA 1-2 | HOST 1 | A-26F | (50, 30, 100) | (20, 25, 0) | NOBODY | ------ |
| CAMERA 2-1 | HOST 2 | A-3F | (160, 30, 90) | (-10, -5, 0) | NOBODY | ------ |
| CAMERA 3-1 | HOST 3 | B-10F | (420, 30, 130) | (30, 0, 15) | USER 2 | ------ |
| CAMERA 3-2 | HOST 3 | B-10F | (500, 30, 110) | (-15, 15, 50) | NOBODY | ------ |
| ------ | ------ | ------ | ------ | ------ | ------ | ------ |

CAMERA MONITORING SYSTEM

BACKGROUND OF THE INVENTION

Present invention relates to a camera control system and, more particularly to a camera control system that allows a single or plurality of users to remote-operate a plurality of cameras.

A video transmission system which enables video transmission or communication by video and audio transmission between arbitrary two (or more) points, by constructing a network by arranging a number of cameras and computers in a building or the like, has been proposed.

In this system, the user at an arbitrary point can remote-operate an arbitrary camera from the point, and/or display a video image from the camera on the display of a computer at the point.

In the video transmission system enabling this remote-operation of an arbitrary camera, as the number of the cameras to be operated increases, it is necessary to easily know positions of the respective cameras.

Generally, in a video conference using a plurality of computers connected via a network, there are a plurality of video cameras and a plurality of users who remote-operate the video cameras. Only one user can operate one camera at one instant. In this case, operation priority must be exclusively assigned to the user by a control method or standard. The camera to be operated is, e.g., identified by a unique name or numeral.

However, in the conventional art, when a user wants to operate a camera, since there is no means for confirming whether or not the camera is actually in controllable status (i.e., any other user is not currently operating the camera, and the user has the operation right), the user merely has to try to remote-operate the camera.

Further, in the conventional art, there is no function for indicating status of use of each camera and its access right (right to see video images and operate them) by real time. This function is indispensable especially for the system administrator, and is also helpful to the other users.

SUMMARY OF THE INVENTION

The present invention has been made in consideration of the above situation, and as its object to provide a camera control system which provides information on status of use of each camera and its access right in a real-time manner.

Another object of the present invention is to provide a camera control system which reflect change of hardware construction such as arrangement of cameras by simple operation by a user.

Further, another object of the present invention is to provide a camera control system which informs status of use and each user's access right by each camera in a real-time manner.

According to the first aspect of the present invention, the first object is attained by providing a camera control system for selecting one of a plurality of controllable cameras connected to a network, and for controlling video display, comprising camera-status display means for real-time displaying statuses of at least two of the cameras.

Further, according to the second aspect of the present invention, the second object is attained by providing a camera control system for selecting one of a plurality of controllable cameras connected to a network, and for controlling video display and camera parameters, comprising: layout-display means; symbol-display means for displaying one or more camera symbols representing the cameras, over a layout displayed on the layout-display means; and change means for interactively changing the camera symbol, in accordance with change of initial setting of the system.

Further, according to the third aspect of the present invention, the third object is attained by providing a camera control system for selecting one of a plurality of controllable cameras connected to a network, and for controlling video display and the camera, comprising: layout-display means; symbol-display means for displaying one or more camera symbols representing the cameras, over a layout displayed on the layout-display means; and change-reflection means for on-line reflecting change of initial setting of the system by one of a plurality of users, on the layout and the camera symbol on a display screen of another user.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing the structure of a camera initial-setting file;

FIG. 9 is an example of layout information;

FIG. 10 is an example of camera initial-setting information;

FIG. 16 is an example of statuses of cameras for the real-time camera management;

FIG. 19 is an example of camera management information for the real-time camera management;

DETAILED DESCRIPTION OF THE PREFERRED EMBODIMENT

Preferred embodiment of the present invention will now be described in detail in accordance with the accompanying drawings.

Figure 1:
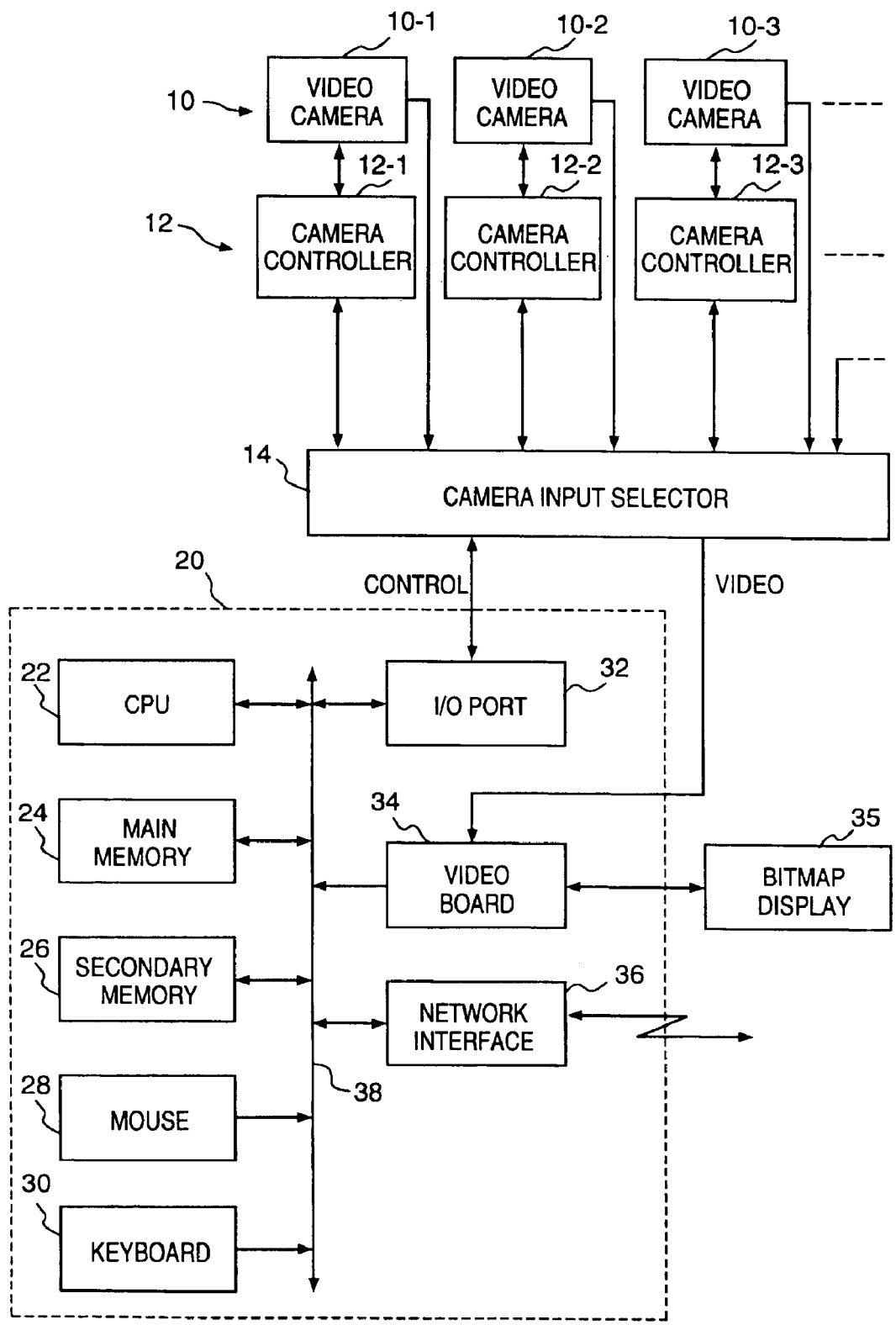
FIG. 1 is a block diagram showing the basic construction of a computer system according to an embodiment of the present invention.

FIG. 1 is a block diagram showing the construction of a computer system according to an embodiment of the present invention, connected to a plurality of cameras as basic elements in the embodiment. A plurality of computers having the construction in FIG. 1 and a plurality of computers having a similar construction to FIG. 1 are mutually connected via a computer network.

In FIG. 1, reference numerals 10-1 to 10-3 denote video cameras; 12-1 to 12-3, camera controllers for directly controlling panning, tilting, zooming, focus adjustment and focal-length adjustment, in accordance with external camera control signals; and 14, a camera input selector for selecting one of the video cameras 10 and inputting the output signal(s) from the selected camera (normally a video signal, but in case of a video camera with a microphone, a video signal and an audio signal. In this embodiment, the output signal is described only as a video signal). A selection line signal from the camera input selector 14 is, e.g., RS-232C and the like, however, the present invention is not limited to this line signal.

Numeral 20 denotes a camera operation unit, comprising a computer system for controlling desired one of the camera controllers 12 by sending control commands to the camera controller 12 via the camera input selector 14; 22, a CPU for controlling the overall system; 24, a main memory; 26, a secondary memory (e.g., a hard disk drive); 28, a mouse as a pointing device; and 30, a keyboard.

Numeral 32 denotes an I/O port, connected to the camera input selector 14, for supplying the camera control signals and the like to the camera input selector 14; 34, a video board for inputting an output video signal from a video camera 10 selected by the camera input selector 14 and displaying various video images on a bitmap display 35; 36, a network interface for connecting the camera operation unit 20 to the computer network or a communication line net; and 38, a system bus for mutually connecting the respective devices, from the CPU 22 to the network interface 36. The camera control signals from remote places are inputted via the network interface 36 to the camera operation unit 20, thus controlling the cameras 10.

The camera input selector 14 selects one of the control signal lines connected to the plurality of camera controllers 12 and one of video outputs, then supplies the selected video output to the video board 34, and logically connects the selected control signal line to the I/O port 32. As a format of the video signal, a luminance-difference separation type NTSC signal is known. The video board 34 inputs the video output selected by the camera input selector 14. The input video signal is displayed as a moving-image in a predetermined window of the bitmap display 35, otherwise it is transmitted to another device.

The secondary memory 26 holds various information on the cameras 10, e.g., camera position information, camera parameter data and the like. The detailed contents of the information will be described later.

In a case where only one camera 10 can be connected, the camera input selector 14 can be omitted. In this case, the I/O port 32 is directly connected to the camera controller 12. In a case where video images are not transmitted, the cameras 10, the camera controllers 12 and the camera input selector 14 can be omitted.

Figure 2:
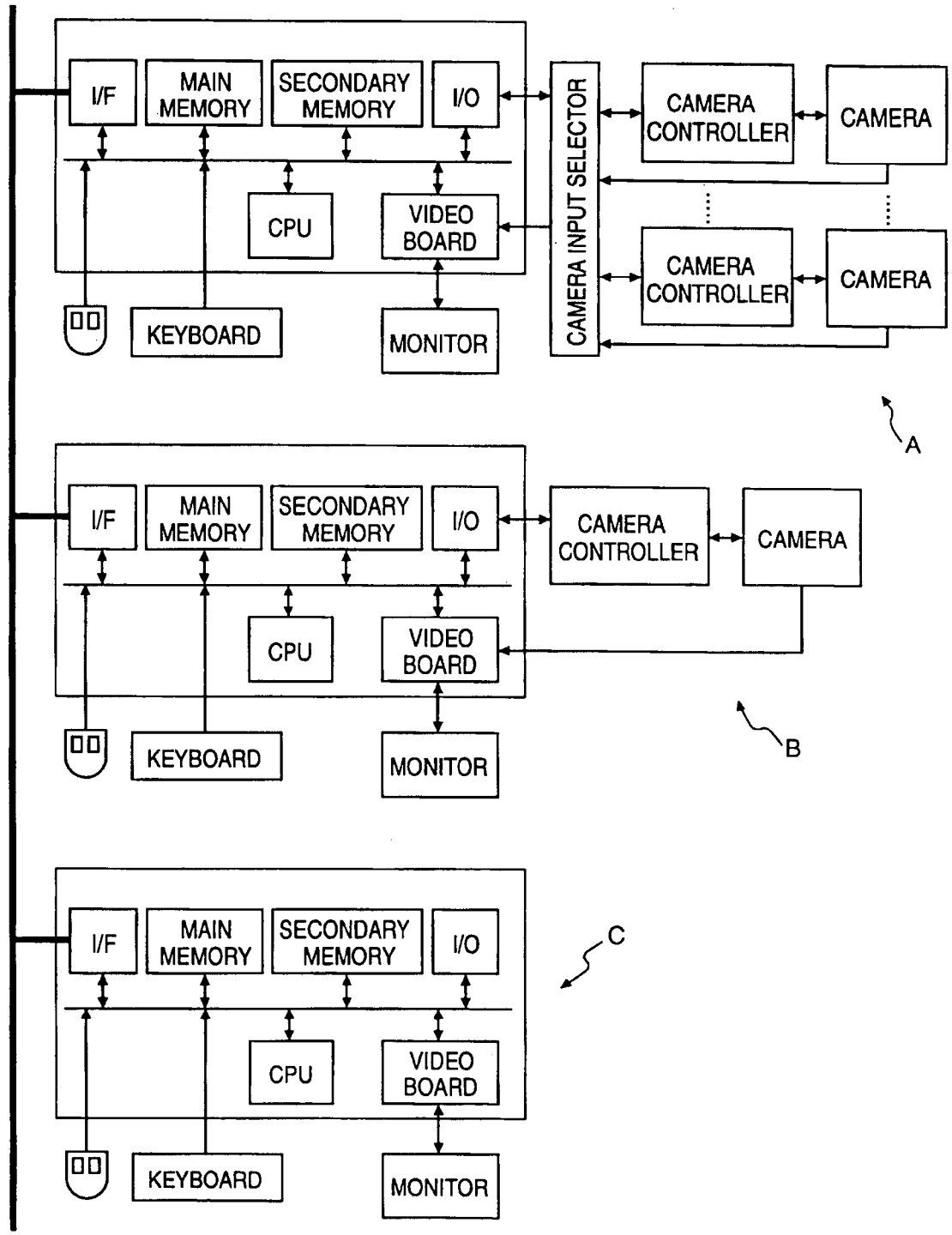
FIG. 2 is a block diagram showing the hardware structure of the embodiment in a network.

The computer system as shown in FIG. 1 is connected into a network as shown in FIG. 2. A terminal A has the construction in FIG. 1. At a terminal B, only one camera is connected, therefore the camera controller is directly connected to the I/O port. At a terminal C, no camera is connected. Generally, an actual network includes various types of terminals such as the terminals A to C. Note that the network of the present embodiment is a LAN or a WAN having a transmission band width sufficient for transmitting digital moving-image data and camera control signals.

The video board 34 has video-capture function to supply input video data not only to the bitmap display 35 for image display but also to the CPU 22 via the bus 38. The CPU 22 arranges the data into packets and outputs the packets to the network via the network interface 36. Also a camera operation command, a camera switchover command and the like are packeted and transmitted onto the network. Further, information on the overall system is packeted and transmitted onto the network. These packet data are transmitted to a specified transmission destination or to all the terminals, in accordance with the data contents and necessity.

Regarding data reception, similar processing is performed. That is, when the packeted video data, camera operation command and camera switchover command are received, the respective terminals A to C handles the received video data in a similar manner to that handling the internal capture data, and also handles the received camera operation command and camera switchover command in a similar manner to that handling the internal commands. The information on the overall system is used to update display of system status to be described later.

Figure 3:
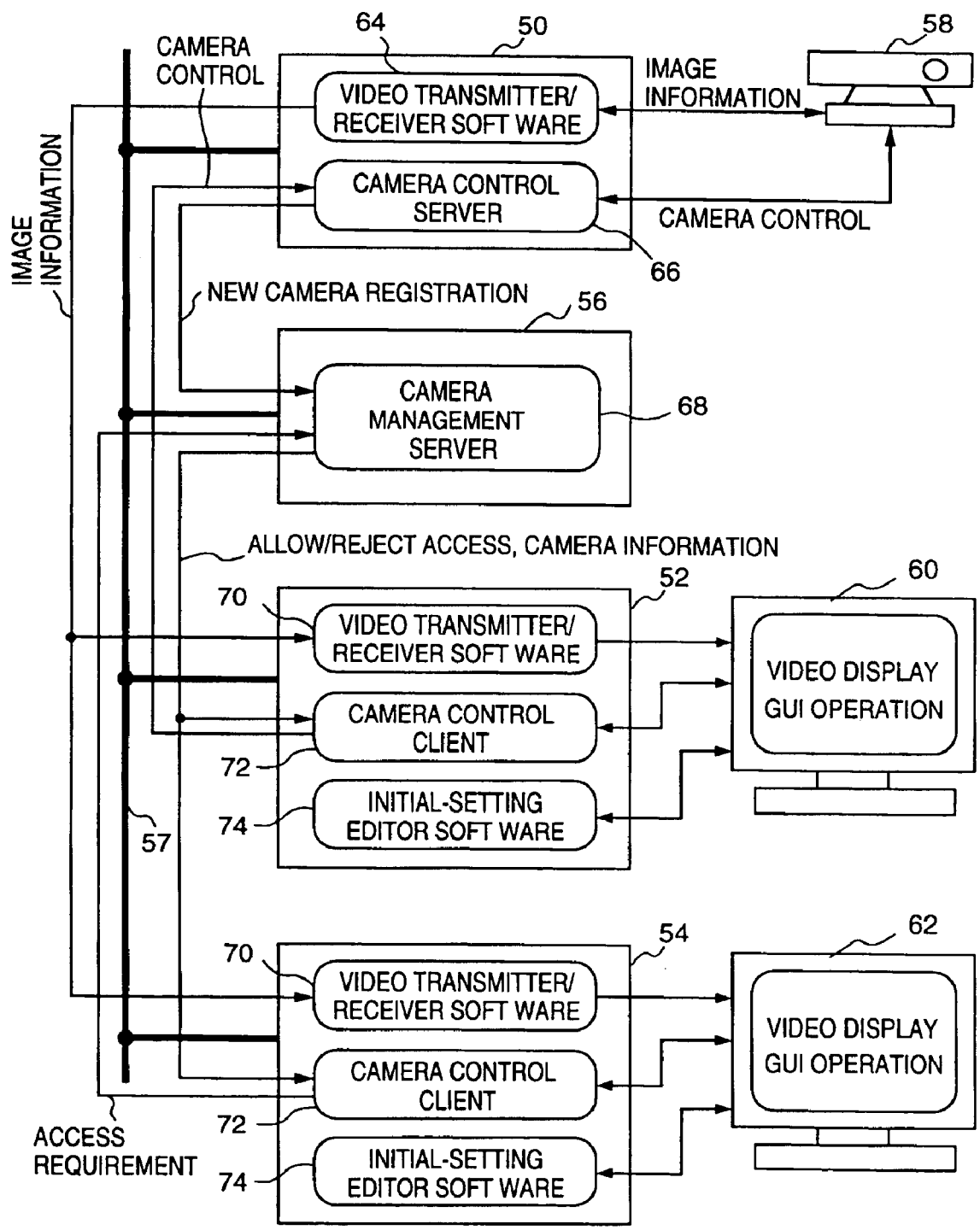
FIG. 3 is a block diagram showing the software interface of the embodiment in the network.

FIG. 3 is a block diagram showing the software interface of the present embodiment. FIG. 3 separately shows software (server) to be installed into a terminal to which a camera is directly connected, and software (client) to be installed into terminals for remote-operating the camera. In general practice, the server and the client are both installed into one terminal.

In FIG. 3, work stations 50, 52, 54 and 56 are connected to a network 57. A camera 58, corresponding a camera 10 in FIG. 1, is connected to the work station 50; and monitors 60 and 62, corresponding to a bitmap display 35 in FIG. 1, respectively to the work stations 52 and 54. Though described in detail later, the work station 56 manages camera(s) remote-operable via the network, access right and status of use for each user.

The work station 50 contains a video transmitter/receiver (software) 64 for transmitting image information (moving image), obtained by the camera 58, to the other work stations via the network 57, and a camera control server (software) 66 for controlling the camera 58 in accordance with camera control signals from the work stations 52 and 54.

A camera management server (software) 68 is installed in the work station 56. Upon activating the camera 58, the camera control server 66 reads a camera initial-setting file, comprising of information as shown in FIG. 4, from the secondary memory (26 in FIG. 1), and reports to the camera management server 68, the names or numbers of all the cameras and their initial statuses (their positions, initial directions and zoom values) connected to the same work station. The camera management server 68 registers the camera 58 into a camera list as available via the network 57.

The work stations 52 and 54 respectively hold a video transmitter/receiver (software) 70 for receiving images (moving images) from the work station 50 and display the images on the monitors 60 and 62, a camera control client (software) 72 for displaying the status of the camera (58), displaying a camera display and operation panel and processing the operation of the camera instructed by using the camera operation panel, and a initial-setting editor (software) 74 for editing the initial settings of the camera control system.

The users of the work stations 52 and 54 can refer to, write into, and correct various informations managed by the camera management server 68, using the camera control clients 72. The details of these operations will be described later. Note that when the camera management server 68 allows connection between a camera of another work station, i.e., camera 58 and the work station 50, the camera control client 72 can transmit a camera control signal to the work station 50 (the camera control server 66) without the camera management server 68.

In general practice, each work station is usually connected to a monitor and a camera, therefore, the both video transmitters/receivers 64 and 70 have both video transmission and reception functions. Generally, software comprises of a single program or a set of program modules. The terminals A and C in FIG. 2 has the work stations 50 and 52 or 54; and the terminal B, the work station 52 or 54. The work station 56 in FIG. 3 may be part of the terminal A, B or C in FIG. 2.

The camera management server 68 is software for managing the cameras, all or partially released to the network 57, used in, e.g., a video conference. The camera management server 68, holding information on the names of all the cameras, their positions, directions and statuses of use, performs registration for connection of the camera to the network 57 and deletion of the registration for disconnection of the camera from the network 57, manages access allowance/rejection to access requirement(s) from the user(s), and periodically notifies camera information to all the camera control clients 72 via the network 57.

In FIG. 3, the camera management server 68 is installed in the dedicated work station, however, it may be installed in any of the work stations (50, 52 and 54) connected to the network 57. Otherwise, the camera management server 68 may be pre-installed in all the work stations to be connected to the network, so that the camera management server 68 is activated at a work station that starts the video conference.

Figure 5:
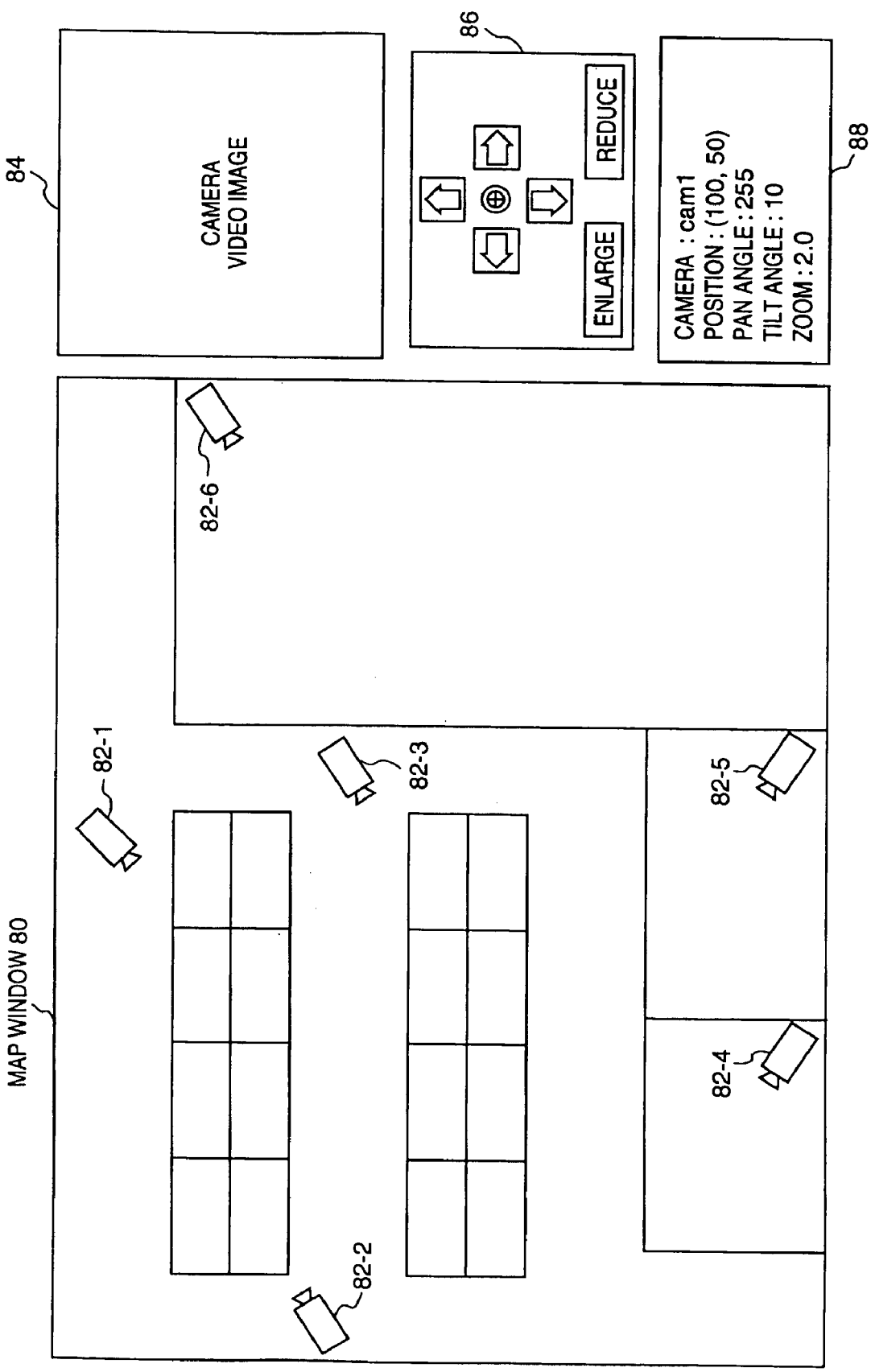
FIG. 5 is an example of a camera display and control panel displayed by a camera control client 72 on monitors 60 and 62.

FIG. 5 shows an example of the camera display and control panel displayed by the camera control client 72 on the monitors 60 and 62. The camera control client 72 generates an image of the camera display and control panel. The camera display and control panel includes a layout window 80 where camera icons indicative of the positions and directions of the respective cameras are overlaid on a layout showing places of cameras, a camera video-image window 84 showing a video image obtained by a current selected camera, a camera operation panel 86 comprising various camera control buttons, and a current value display window 88 showing parameter values of the currently selected camera. The camera control client 72 displays the camera display and control panel on the monitors 60 and 62. In the embodiment, it is assumed that a window display system capable of simultaneously displaying a plurality of windows is employed. In the layout window 80, a layout showing desks of the staff of an office and the like is displayed, and camera icons 82-1 to 82-6 respectively indicating the camera positions are displayed over the layout. The camera icons 82-1 to 82-6 are displayed in directions substantially the same as those of corresponding cameras.

In the video-image window 84, an output video image from the selected camera is displayed. Note that on the layout window 80, to identify the selected camera, the camera icon corresponding to the selected camera is displayed in a color different from that of the other camera icons corresponding to unselected cameras.

The operation panel 86 is displayed below the camera video-image window 84. The operation panel 86 has rotation buttons for panning and tilting, and two buttons for zooming. By manipulating these buttons, rotation and/or zooming of an arbitrary selected camera can be made. In a case where the selected camera is not operable, the display status of the rotation buttons and the zoom buttons changes into another display status indicative of inoperable status of the camera. In the current value display window 88, the current values (position, pan-angle, tilt-angle and zoom value) of the selected camera are displayed.

For example, a user who wants to access (remote-operate) a camera double-clicks a camera icon indicating the target camera. In correspondence with the operation, the camera control client 72 requires the camera management server 68 for access right of the camera. If the camera is not accessed, the camera management server 68 allows remote operation (including video display) of the camera, while if there is another user who currently operates the camera, rejects the remote operation. When the access right is assigned, the output video image from the camera is displayed in the camera video-image window 84, thus operation by using the camera operation panel 86 (panning, tilting and zooming) can be made.

In the embodiment, addition of a new camera, removal, movement, and direction change of any of the cameras can be reflected in the initial-setting file by using the initial-setting editor 74.

Figure 6:
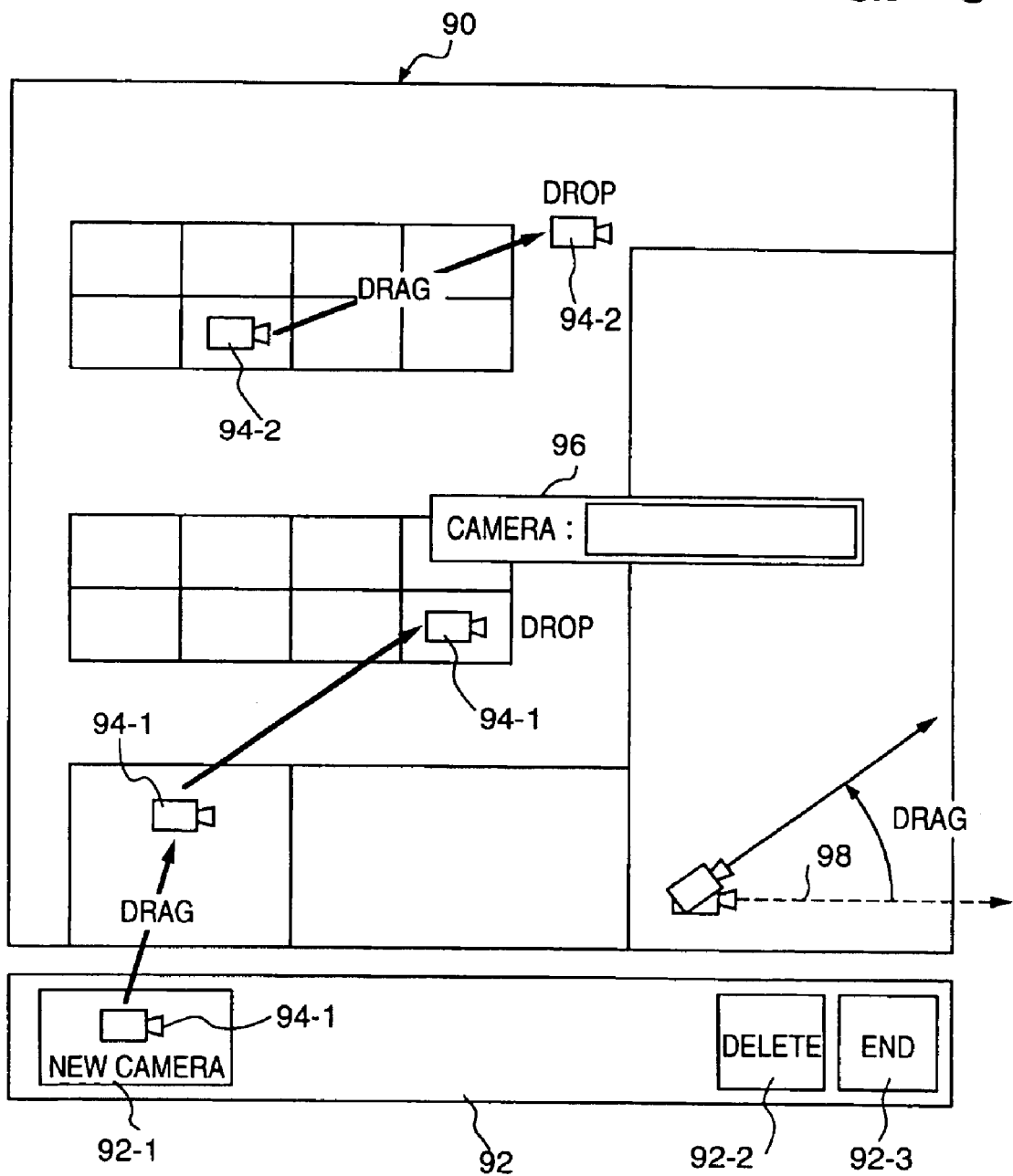
FIG. 6 is an example of a display image of an initial-setting editor 74.
Figure 7:
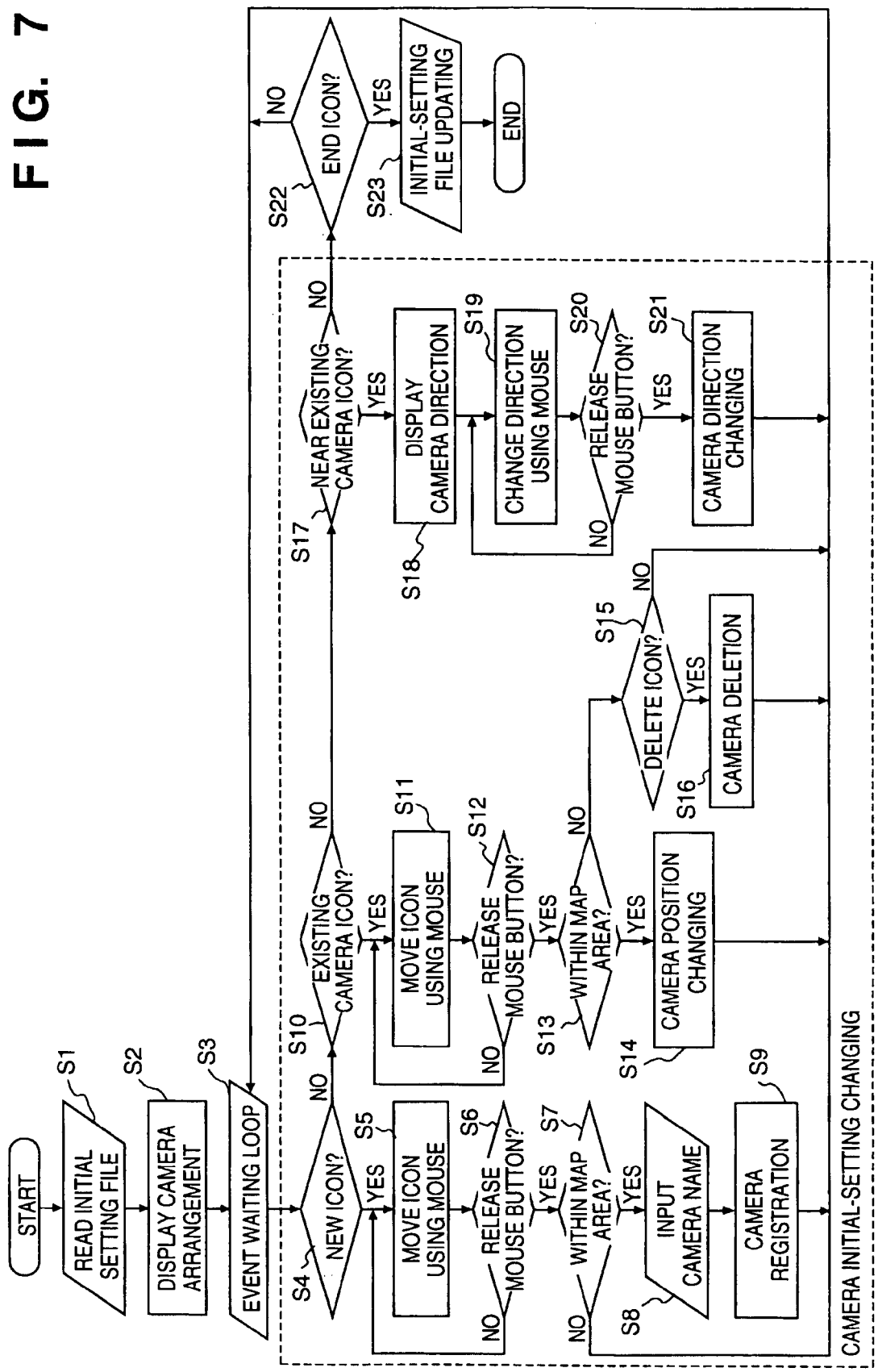
FIG. 7 is a flowchart showing the operation of the initial-setting editor 74 corresponding to FIG. 6.

FIG. 6 shows an example of the display image of the initial-setting editor 74. FIG. 7 shows the operation flow-chart corresponding to FIG. 6. In FIG. 6, the respective elements have reference numerals corresponding to operations at the respective steps in FIG. 7. The initial-setting editor 74 may be activated by the camera control client 70, or may be activated independently.

Upon activation of the initial-setting editor 74, it reads a camera initial-setting file as shown in FIG. 4 (S1), displays a camera arrangement as shown in FIG. 6 (S2), and proceeds to an event waiting loop (S3). The contents of the camera initial-setting file are maintained as a camera initial-setting list, in the initial-setting editor 74.

Referring to FIG. 6, the display image includes a layout part 90 and a command icon part 92. In the layout part 90, similar to the layout window 80 of the camera display and control panel (FIG. 5), camera icons are displayed over the layout. The respective camera icons are provided at the positions and directions of the cameras registered in the initial-setting file. In the command icon part 92, a new icon 92-1 showing a new camera icon 94-1 to be added, a deletion icon 92-2 for deleting an existing camera, and an end icon 92-3 for terminating the initial-setting editor 74 are displayed.

When any event occurs in the event-waiting loop, whether or not it requires processing is determined (S4, S10, S17 and S22), and any of processings appropriate to the event is performed.

Next, a case where a camera is newly provided will be described. In this case, the user moves a mouse cursor onto the new camera icon 92-1 and press the mouse 28 (S4). The initial-setting editor 74 generates the new camera icon 94-1 as shown in FIG. 6 and displays the icon in the new camera icon 92-1. The user moves the mouse cursor selecting the camera icon 94-1 to a desired position (S5), and releases the button of the mouse (S6). That is, the user drags the camera icon 94-1 to the desired position by using the mouse. If the position where the mouse button is released is outside of the layout area (S7), the process returns to the event-waiting loop, while if the position resides within the layout area (S7), a dialog 96 for inputting a name of the new camera is displayed (S8).

Thus, the setting position and the name or number of the new camera are given, and they are added to the camera initial-setting list (S9).

In a case where an existing camera is moved or removed, the following operation is made. The user selects the camera icon of the camera to be moved or removed, 94-2 in FIG. 6 (S10), and in case of movement, drags the selected icon to a desired destination position, or in case of deletion, drags the selected icon to the deletion icon 92-2 (S11), and releases the mouse button (S12). If the position where the mouse button is released resides within the layout area (S13), the camera position on the camera initial setting list is updated with the position as a new position of the camera 94-2 (S14). If the position resides outside of the layout area (S13) and on the deletion icon 92-2 (S15), the information on the camera 94-2 is deleted from the camera initial setting list (S16). That is, all the information on the camera 94-2 is deleted from the camera initial setting list. If the position where the mouse button is released outside of the layout area (S13) and not on the deletion icon 92-2 (S15), the selected camera icon is moved to the initial position, and the process returns to the event-waiting loop.

In a case where the initial direction of a camera is changed, the following operation is made. The user positions the mouse cursor around the camera icon (within a predetermined radius of the center of the camera icon) indicating the camera, and press the mouse button (S17). In correspondence with the pressing of the mouse button, the initial-setting editor 74 displays a dotted-line arrow 98 extends from the center of the camera icon along the initial direction (S19). The direction of the arrow 98 indicates a pan angle, and the length, a tilt angle. The user changes the direction and the length of the arrow 98 by moving the mouse cursor with pressing the mouse button. When the arrow 98 has a desired direction and a desired length, the user releases the mouse button (S20). The changed direction and length are new initial values of pan angle and tilt angle. Then, the contents of the camera direction information in the camera initial-setting list are updated (S21).

When the user wants to terminate the camera initial-setting editor 74, the user moves the mouse cursor onto the end icon 92-3, and clicks the mouse button (S22). In correspondence with the click, the camera initial-setting editor 74 updates the camera initial-setting file with the information on the camera initial setting list held in the program (S23).

Thereafter, when the entire system is restarted, the changes are reflected on the camera control server 66, the camera management server 68 and the camera control clients 72 through steps S9, S14, S16 and S21. In this manner, the user can visually and interactively generate the initial-setting file indicating the camera arrangement and can update the file by using the initial-setting editor 74.

Figure 8:
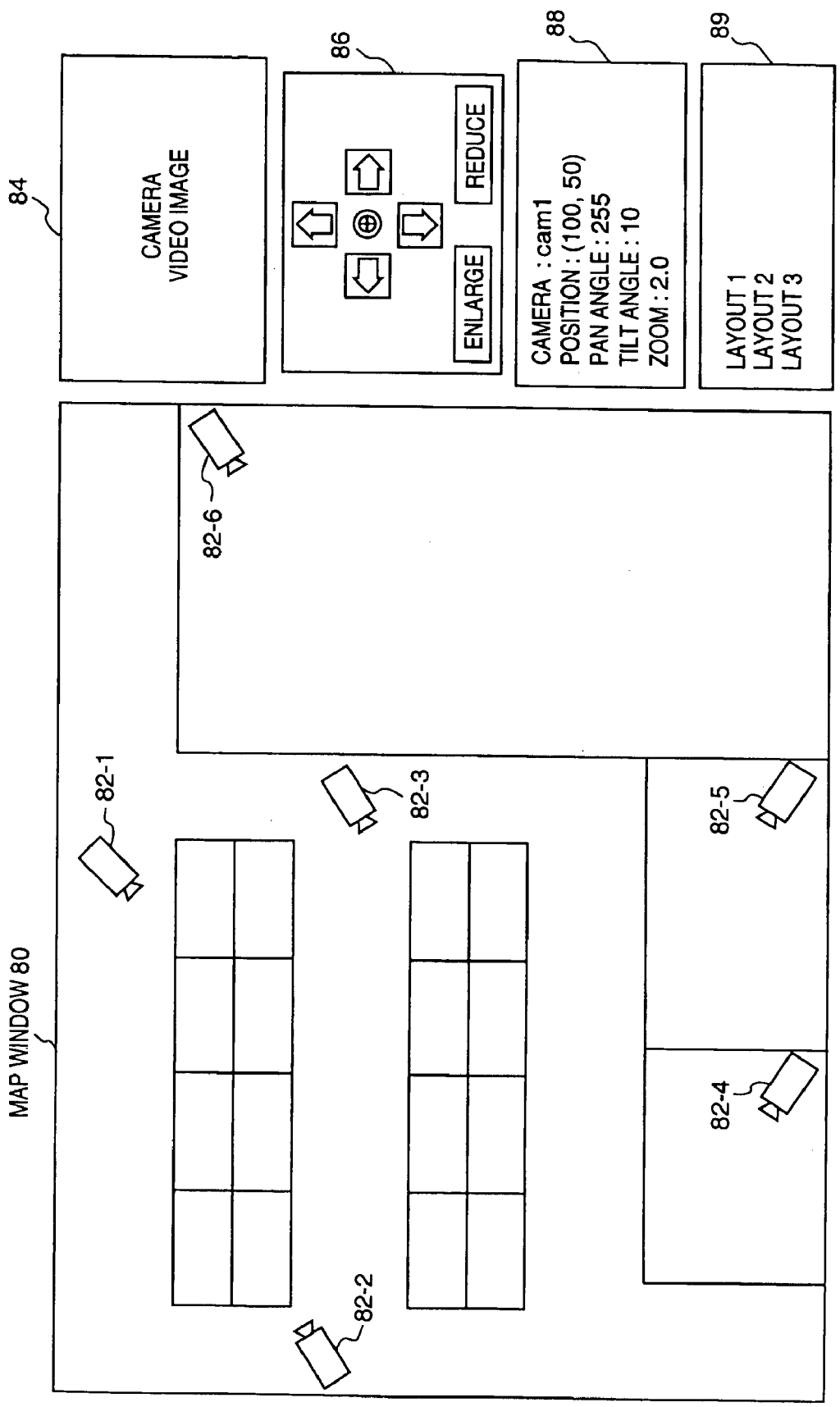
FIG. 8 is another example of the camera display and control panel.

In consideration of a case where a number of cameras are provided at remote places, e.g., in separate rooms or on separate floors, it is preferable that a plurality of layouts can be handled. For this purpose, function for layout selection may be added to the camera display and control panel displayed by the camera control client 72 on the monitors 60 and 62. FIG. 8 shows an example of the camera display and control panel in this case. In FIG. 8, the elements corresponding to those in FIG. 5 have the same reference numerals. Numeral 89 denotes a layout list window for displaying a plurality of layouts. In this window, a selected one of the layouts is displayed in the layout window 80 with the camera icons indicating the cameras provided there. This layout list window may be replaced with a menu at the top of the panel image or a floating pallet.

The information on the plurality of layouts is stored in, e.g., the camera management server 68, and upon activation of the camera control client 72, it receives the camera initial-setting information and the information on a necessary layout from the camera 5 management server 68. The plurality of layouts are managed, e.g., in a layout management file as shown in FIG. 9. The layout management file has layout numbers (ID), floor numbers, bitmap file names and bitmap sizes. This layout management file is held in the work station 56 where the camera management server 68 exists. Upon activation of the camera management server 68, it reads the layout management file and stores it within the server. The layout management file and the layout data are transferred to the camera control clients 72 in accordance with necessity.

Further, it is necessary to add items to the layouts where the cameras are provided corresponding to the respective cameras to the camera list managed by the camera management server 68. Also, it is necessary to add the information on the layouts where the cameras are provided corresponding to the respective cameras to the camera initial-setting information held as the camera initial-setting file, as shown in FIG. 10. On the camera display control panel, only the cameras provided on the layout displayed in the layout window 80 are objects to selection and operation.

Figure 11:
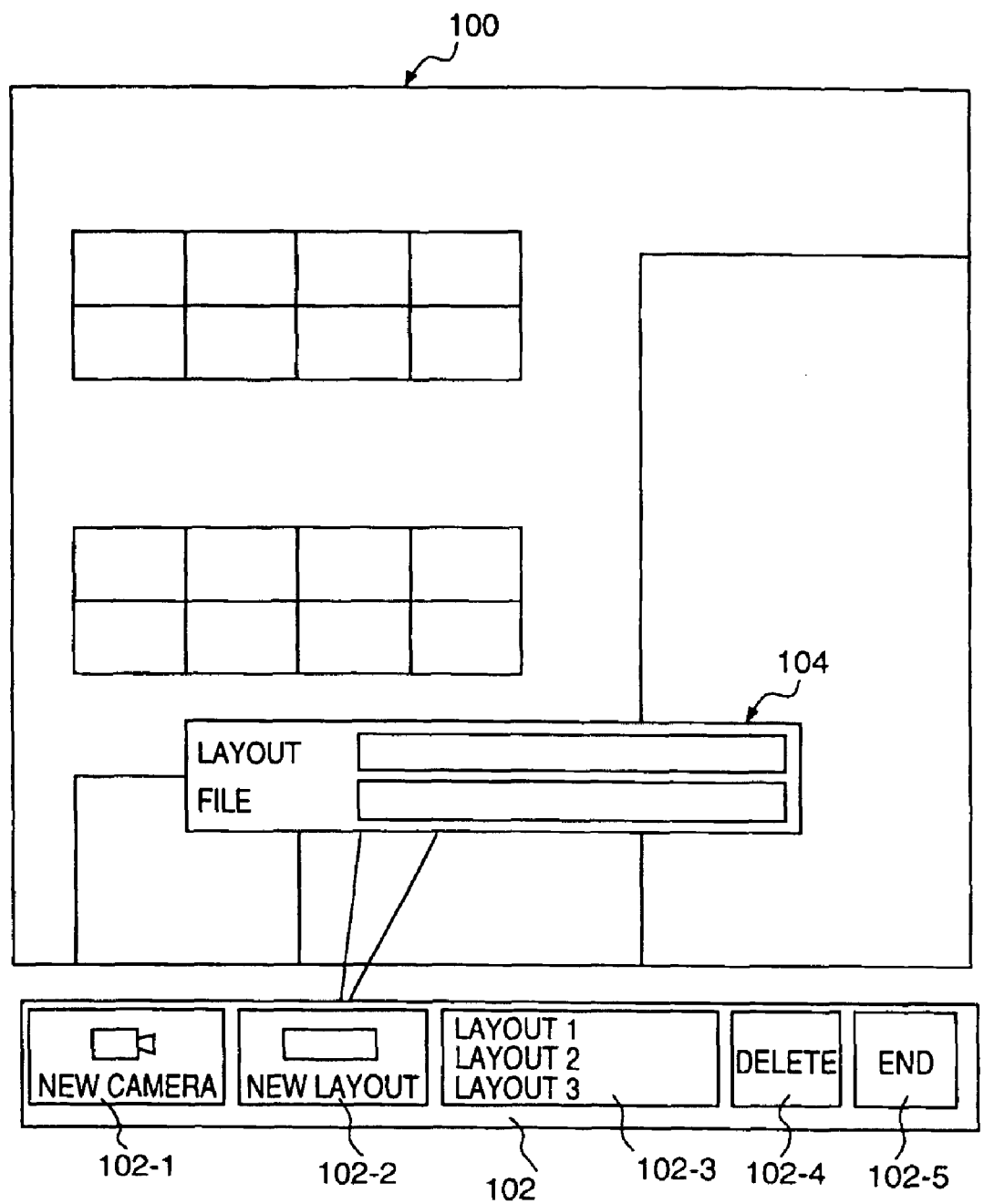
FIG. 11 is another example of a display image of the initial-setting editor 74.

Furthermore, in consideration of addition, it is preferable to add function for adding and deleting layouts to the initial-setting editor 74, deletion and movement of camera(s). FIG. 11 shows the display image of the initial-setting editor 74 where its function is expanded. In FIG. 11, in a layout part 100, similar to the layout part 90 in FIG. 6, a layout (selected from the layout list) is displayed, and camera icons corresponding to the cameras provided there are displayed over the layout. In a command icon part 102, an new icon 102-1 for adding a new camera, a new icon 102-2 for adding a new layout, a layout list window 102-3, a deletion icon 102-4 for deleting camera icon(s) and a layout and an end icon 102-5 for terminating the initial-setting editor 74.

Figure 12:
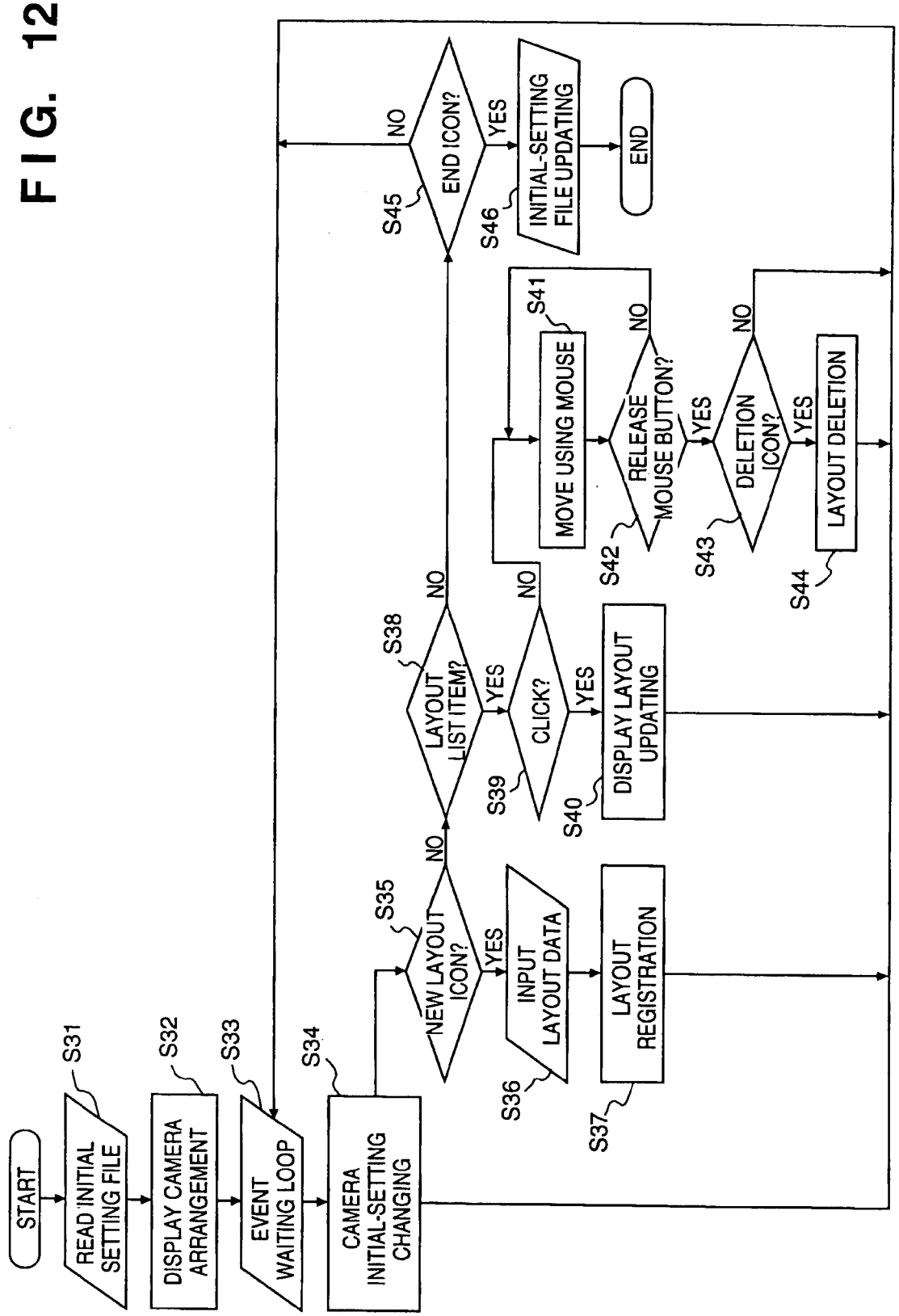
FIG. 12 is a flowchart showing the operation of the initial-setting editor 74 corresponding to FIG. 11.

FIG. 12 is a flowchart showing the operation of the initial-setting editor 74 with the expanded function. Note that the operations of camera icon, are identical to steps S4 to S21 in FIG. 7, enclosed with a broken line, therefore the operations are represented as step S34 in FIG. 12 and the explanation of those steps will be omitted.

First, the layout management file and the camera initial-setting file stored in the formats shown in FIGS. 9 and 10 are read (S31), and the camera arrangement as shown in FIG. 8 is displayed based on the read information (S32), then the process enters an event-waiting loop (S33). Note that the contents of the layout management file and the camera initial-setting file are respectively stored in the camera management server 68 as a layout list and a camera initial setting list.

When any event occurs in the event-waiting loop, whether or not it requires processing is determined (S34, S35, S38 and S45), and any of processings appropriate to the event is performed.

In the event-waiting loop, when the user clicks the new icon 102-2 with the mouse (S35), a dialog 104 is displayed for inputting layout information such as the name of a layout to be added and a bitmap file name (S36). When the input has been completed, the input information on the new layout is added to the layout list stored in the camera management server 68, and the updated layout list is displayed in a layout list window 102-3 (S37). Thus, the added new layout can be selected on the layout list window 102-3.

In the event-waiting loop, when the mouse cursor is on any of the layouts displayed in the layout list window 102-3, if the user presses the mouse button (S38), the process advances to updating of displayed layout or deletion of layout. If the user releases the mouse button immediately, the operation is regarded as a click (S39), then the layout displayed in the layout part 100 is changed to the layout selected on the layout list window 102-3 (S40). If the user moves the mouse cursor while pressing the mouse button (S39), the layout selected on the layout list window 102-3 is moved with the movement (drag) of the mouse cursor (S41). If the user releases the mouse button on the deletion icon 102-4 (S42 and S43), the layout is deleted from the layout list window 102-3 (S44). To avoid erroneous deletion, a dialog for confirming the layout to be deleted is displayed, and after the user's confirmation, the selected layout is deleted from the layout list window 102-3, then the information on the selected layout is deleted from the layout list, and at the same time, the information on the camera(s) provided on the displayed layout is deleted. If the user releases the mouse button outside of the deletion icon 102-4 (S43), the process returns to the event-waiting loop.

When the mouse cursor is positioned on the end icon 102-5, if the user presses the mouse button (S45), the contents of the initial-setting are saved in the initial-setting file, and the program terminates (S46). The initial-setting contents are saved as the information on the layouts as shown in FIG. 9, and the information on the cameras as shown in FIG. 10, in the initial-setting file. To validate the updated information, the entire system must be restarted.

Figure 13:
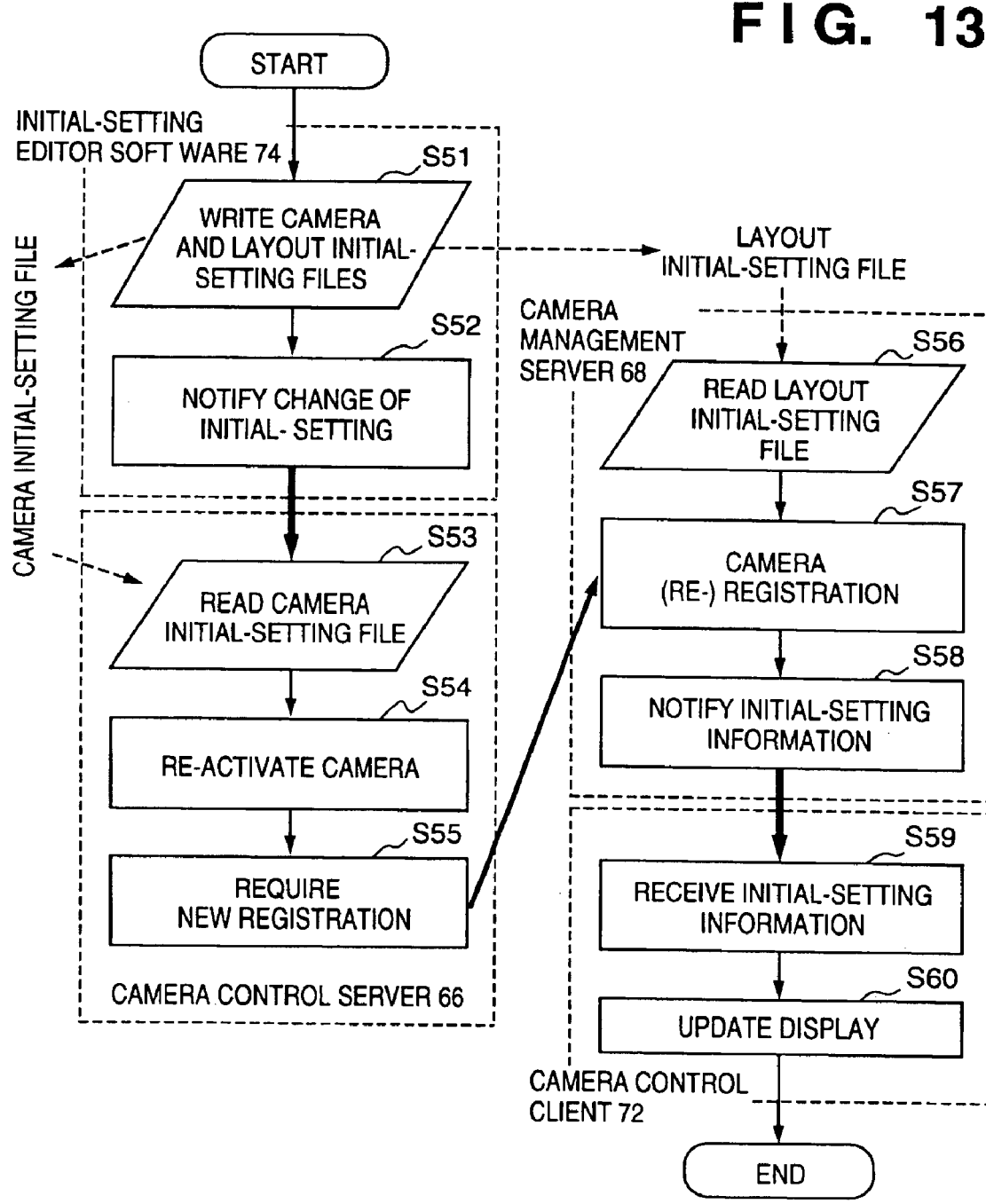
FIG. 13 is a flowchart showing a procedure to validate system change without restarting the system.

When change of initial settings is made, to validate the updated initial-setting information without restarting the system, the content of the change may be informed to the camera management server 68 so that the camera management server 68 notifies the camera control clients 72 of the change. FIG. 13 shows the notification procedure.

FIG. 13 shows the procedure of interactive notification of updated system initial settings among the initial-setting editor 74, the camera control server 66, the camera management server 68 and the camera control clients 72 via communication through the network.

First, as described in FIG. 12, the initial-setting editor 74 writes the updated initial setting information into the camera initial-setting file and the layout information file (S51). The camera initial-setting file may be saved by each camera control client 72 or may be saved as one system file. Further, save area may be in the secondary memory of any terminal connected to the network, however, normally in the secondary memory of the terminal where the camera management server 68 is held.

The initial-setting editor 74 notifies the change of the initial settings to the camera control server 66 on the terminal connected to the camera (there may be a plurality of camera control servers) and terminates (S52). The notification is performed in accordance with, e.g., RPC (Remote Procedure Call) or TCP/IP based socket communication procedure. Note that any other method can be employed. Similarly, the following communication between processes may be performed in accordance with any method and it is not limited to one method.

The camera management server 68 receives the notification of change of initial settings, then reads the layout management file and updates the internal layout list (S56). On the other hand, the camera control server 66 reads the camera initial-setting file (S53), and if a new camera has been connected under its own control, tries to activate the newly-connected camera (S54). If the activation is successful, the camera control server 66 informs the camera management server 68 for new registration (S55). In a case where the camera's power is not turned on, the activation fails. In this case, the new registration on this camera is not made in the camera management server 68. If the position (and/or direction) of an existing camera is changed, the camera control server 66 that controls the camera notifies the camera management server 68 of re-registration of the new position (and/or direction) (S55).

The camera management server 68 receives the requirement of registration or re-registration from the camera control server 66, and updates the information on the initial settings of the camera list (S57). Thereafter, the camera control server 66 notifies all the camera control clients 72 of the change of the system, and transmits information on the new initial settings (S58).

The camera control client 72 receives the notification of the change of the system, and updates display based on the received initial setting information (S60).

In this manner, the changed initial settings can be validated without stopping and restarting the system.

As it can be easily understood from the above description, according to the present embodiment, the user can easily change camera arrangement and a layout to be used. In such change operations, operability is improved by using the simple user interface.

Further, the results of changing the initial settings can be automatically reflected on the display of the camera control client without stopping the system.

Figure 14:
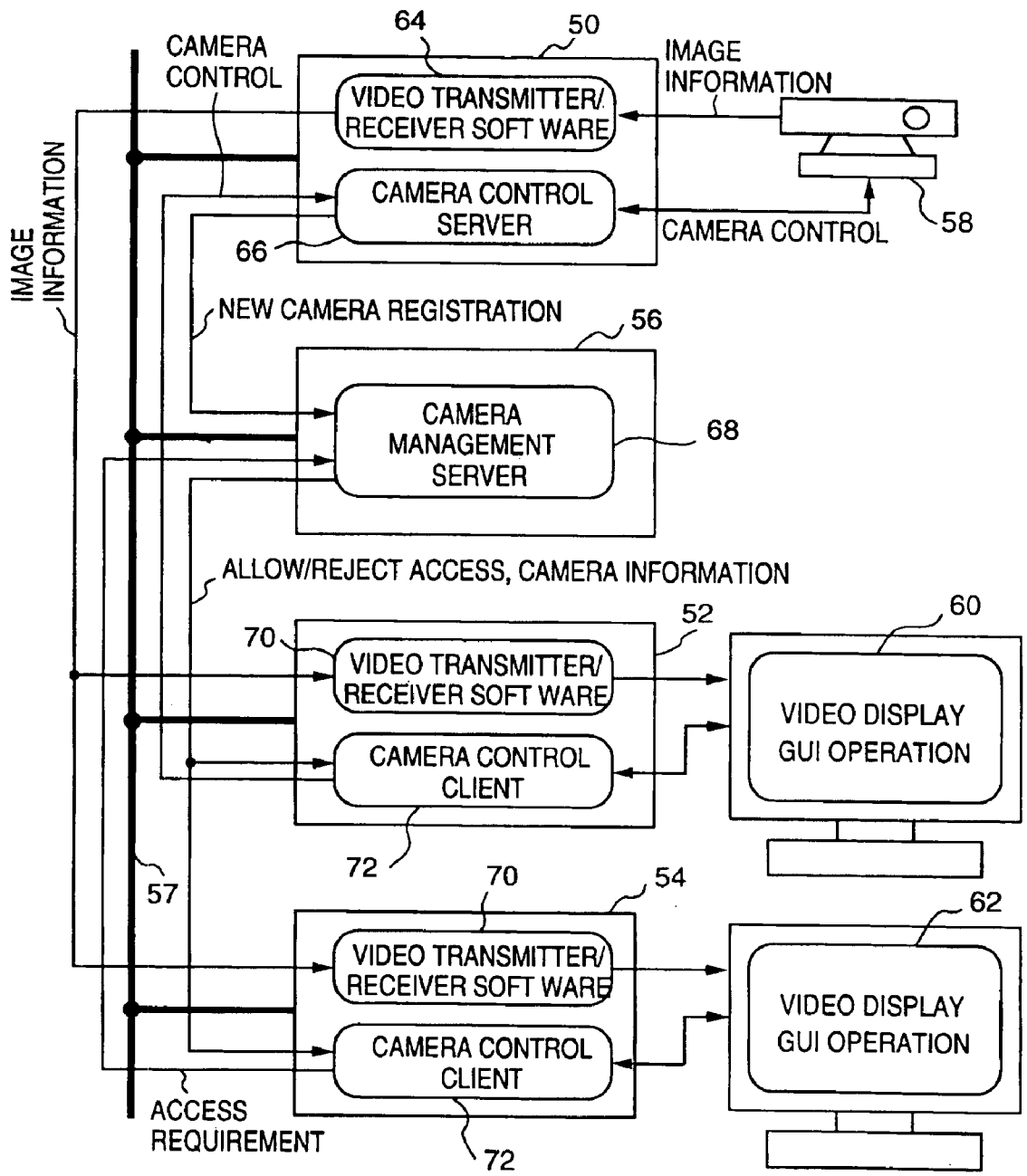
FIG. 14 is a block diagram showing the software structure in a network, for real-time management of cameras.

Next, real-time management of statuses of cameras connected to the network will be described. Note that as shown in FIG. 14, the real-time camera management can be performed without the initial-setting editor 74 shown in FIG. 3. Accordingly, the following description will be made with reference to FIG. 14.

Figure 15:
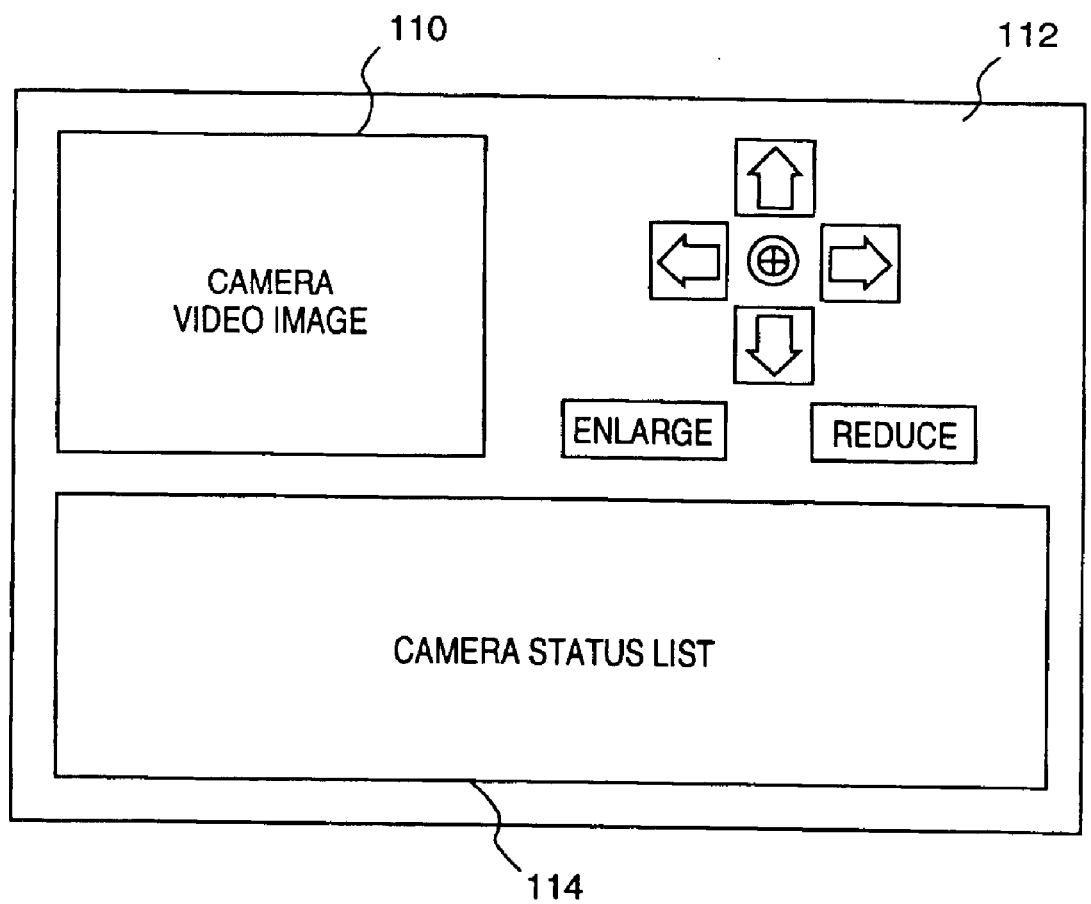
FIG. 15 is an example of a first image for the real-time camera management.

FIG. 15 shows an example of the camera display and control panel displayed by the camera control client 72 on the monitors 60 and 62. The camera control client 72 generates an image of the camera display and control panel. The camera display and control panel includes a camera video-image window 110 showing a video image obtained by the current selected camera, a camera operation panel 112 comprising various camera control buttons, and a camera status list window 114 showing the statuses of the cameras. The camera control client 72 displays the camera display and control panel on the monitors 60 and 62.

FIG. 16 shows an example of the contents displayed in the camera status list window 114. In the camera status list window 114, camera names, positions, pan angles, tilt angles, zoom values and statuses of use of all the available cameras connected to the network 57 are displayed. The camera names are unique names to identify the respective cameras; positions, three-dimensional coordinates indicating points where the cameras are appropriately provided; and pan angles and tilt angles, image-sensing distances. The statuses of use indicate a user who currently has access right. When one camera is not used by an user, the corresponding cell of the statuses of use is blank, otherwise "NOBODY" is displayed.

For example, when a user wants to access (remote-operate) to one of the cameras, the user selects (by e.g., double-click of the mouse) the desired camera on the camera list displayed in the camera status list window 114. If there is no user accessed to the camera, the camera management server 68 allows the user to remote-operate the camera (including display of video images), while if there already is another user operating the camera, the camera management server 68 allows only to display the video image from the camera. As the video-image display is allowed, the output image from the camera is displayed in the camera video-image window 110. When the remote operation is allowed, operation (panning, tilting and zooming) by using the camera operation panel 112 becomes possible.

Next, the procedure of real-time updating and displaying the camera directions will be described. First, software activation procedure will be described with reference to FIG. 17. The camera management server 68 is activated earlier than all the other softwares and waits for connection of cameras (S101).

Figures 17, 18:
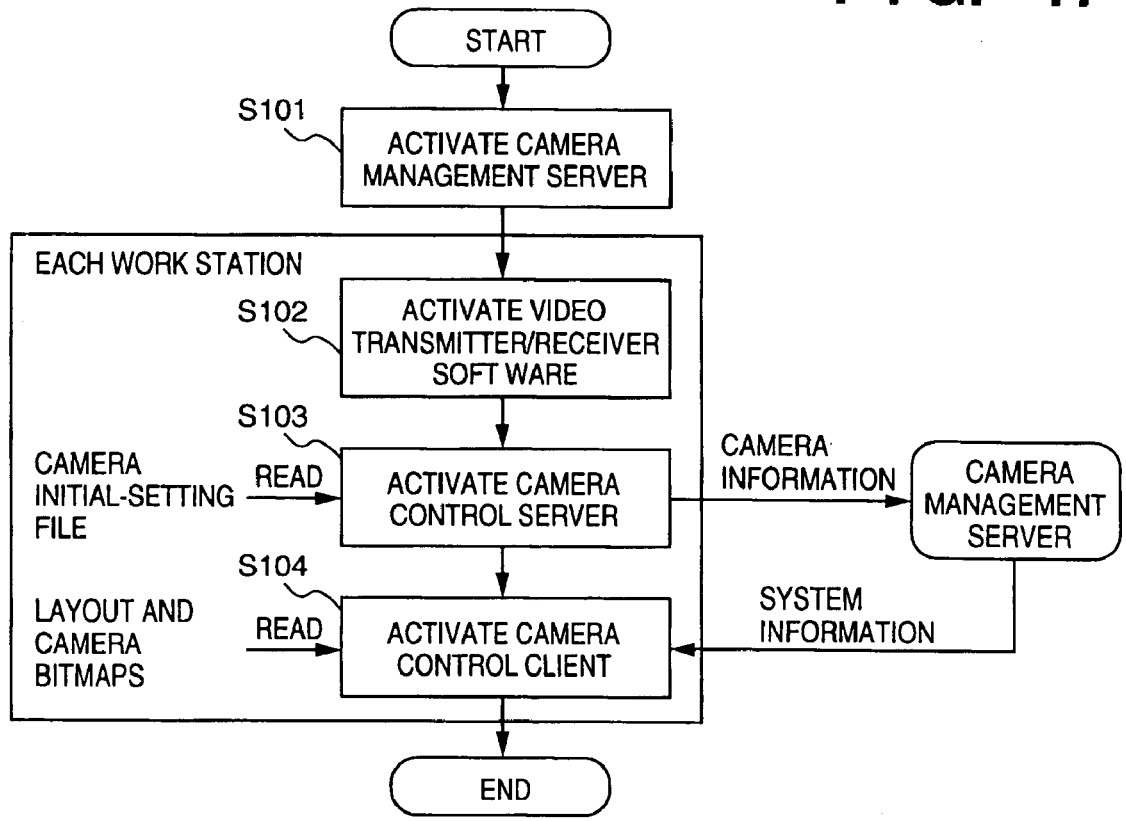
FIG. 17 is a flowchart showing a software starting procedure for the real-time camera management.
FIG. 18 is an example of camera initial-setting information of the second embodiment.

Next, the video transmitter/receiver 64 and the camera control server 66 on the same work station are activated (S102 and S103). Upon activation, the camera control server 66 reads the camera initial-setting file, and notifies the camera management server 68 of the camera names and the initial statuses of all the cameras connected to the same work station. The information, including camera names/numbers, floor numbers, camera positions (x-, y- and z-coordinates), initial attitudes (pan angle and tilt angle) as shown in FIG. 18 and the like, is stored in the secondary memory.

The camera management server 68 receives the information on the connected cameras from the camera control server 66, and registers the initial statuses of the cameras into its own camera management table as shown in FIG. 19. In FIG. 19, the camera management table shows camera names/numbers, connected work stations (hosts), statuses of use (unused(blank)/user name), initial statuses (x-, y- and z-coordinates and panhead parameters such as pan angles and tilt angles) and dynamic statuses (camera head angles based on panhead parameters and zoom values).

Next, the video transmitter/receiver 64 and the camera control server 66 are activated on all the computers which are to transmit video images to the network 57.

In a computer which is to operate another computer's camera via the network 57, the video transmitter/receiver 70 and the camera control client 72 are activated. Note that in a computer which is only to receive video images from another computer, only the video transmitter/receiver 70 is activated. Upon activation of the camera control client 72, it receives the information on all the cameras available via the network 57 from the camera management server 68, and displays the information as the camera list in the camera status list window 114. Thus, the users of computers, where the camera control clients 72 are activated, can know the statuses of all the cameras.

If there is change of the information on the statuses of all the cameras via the network 57, the camera management server 68 notifies the computers holding the camera control clients 72 of the change periodically. The computers input the change information and updates the camera list in the camera status list window 114.

Figure 20:
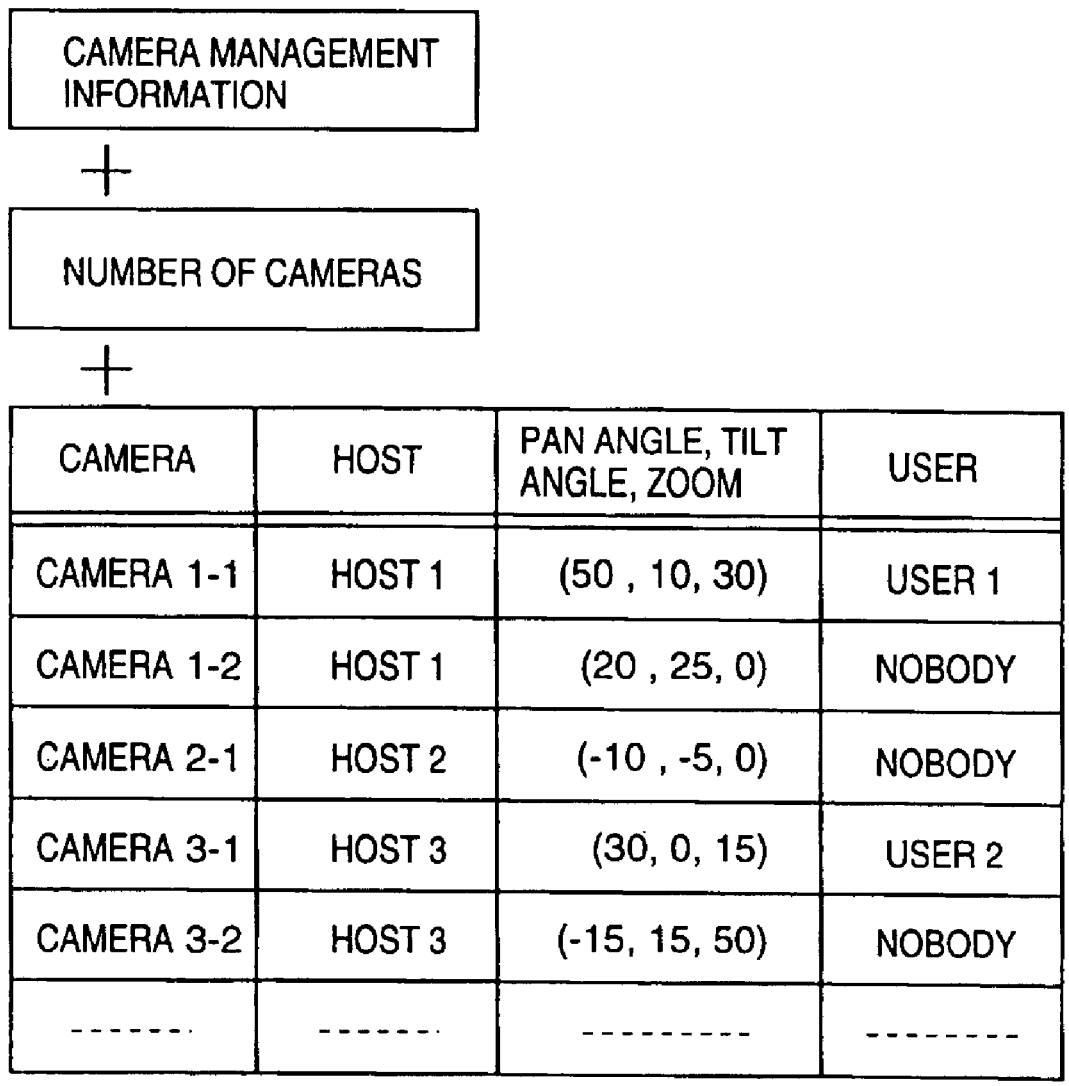
FIG. 20 is an explanatory-view showing notification information for the real-time camera management.

Next, the operation of notifying system information by the camera management server 68 will be described. The system information is as shown in FIG. 20. Note that FIG. 20 shows only a part of the information managed by the camera management server 68. Since upon activation of the camera control client 72, it receives all the information including the camera initial-setting information from the camera management server 68, it only receives dynamically changing information. FIG. 20 gives as the object of notification, information assisting the camera control client 72 to detect all the available cameras or camera access information (operation of the camera management server), in addition to items (camera parameters such as pan angles, tilt angles and zoom values) changed in correspondence with user's camera control.

Figure 21:
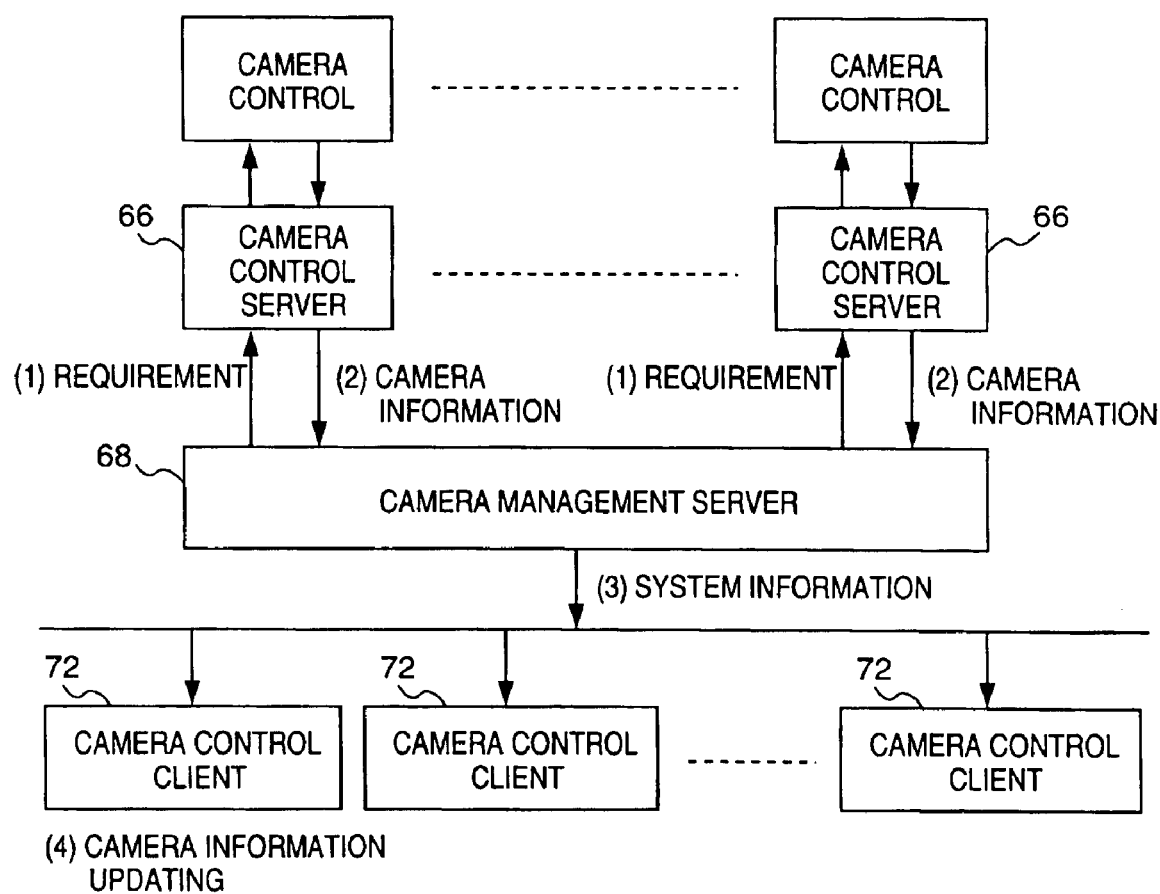
FIG. 21 is a block diagram showing a notification procedure for the real-time camera management.

The notification procedure will be briefly described with reference to FIG. 21. The camera management server 68 requires one camera control server 66 to obtain camera parameters of the corresponding camera. The camera control server 66 performs communication with a camera control circuit to obtain the camera parameters, and returns the obtained camera parameters to the camera management server 68. After confirming the response, the camera management server 68 commands another camera control server 66 for camera parameters of the corresponding camera. In this manner, the camera management server 68 obtains the camera parameters from all the camera control servers 66 on the system. Thereafter, the camera management server 68 generates the system information as shown in FIG. 20, and notifies all the camera control clients 72 of the information as the system information via the network 57.

After the activation of the camera control client 72, it always monitors the buffer of a channel on which the system information is inputted via the network interface 36. When there is any input in the buffer, the camera control client 72 reads the input as notification information, and in accordance with necessity, updates the camera list as follows.

If it is found that a new camera has been added to the system, the camera control client 72 informs the camera management server 68 for the camera initial-setting information. Then, the camera control client 72 adds the obtained camera initial-setting information and the notification information, and displays the information on the camera list. If it is found that a camera has been removed from the system, the camera control client 72 deletes the information on the removed camera from the camera list.

If there has been change(s) in camera access statuses, the camera control client 72 updates the content of the-status of use of the corresponding camera in the camera list.

In this manner, the users, who are to remote-operate via the network 36 the camera of another computer connected to the network 36, can always know the current status of the entire system, and can know in advance whether or not a desired camera is available.

In this example, the information on all the cameras is displayed in the camera status list window 114, however, it is not clear as to the position and direction of the respective cameras or a camera selected by the user.

Figure 22:
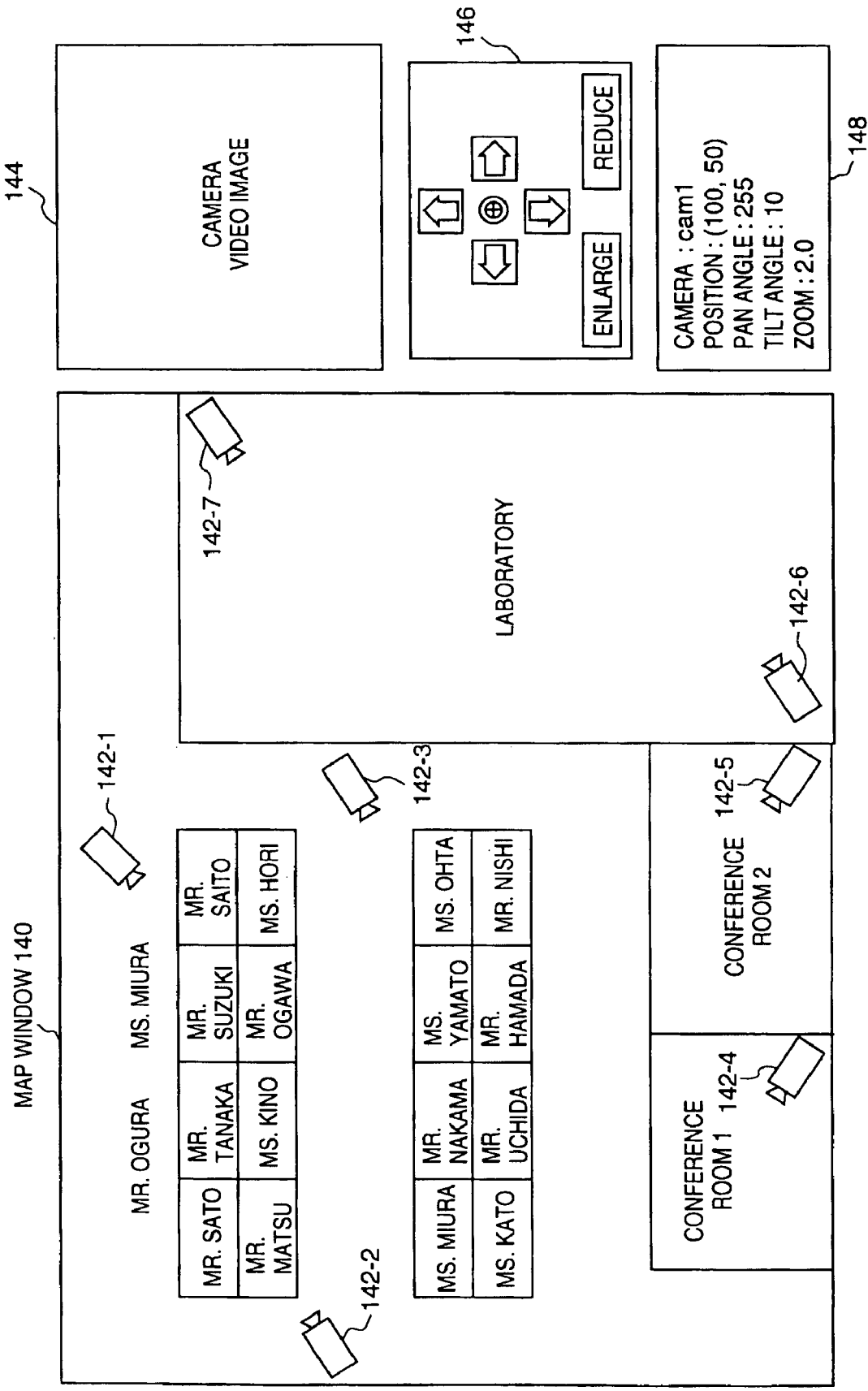
FIG. 22 is an example of a display image for the real-time camera management.

This problem can be solved by using a user interface as shown in FIG. 22.

In FIG. 22, it is assumed that a window display system capable of simultaneously displaying a plurality of windows is employed. In a layout window 140, a layout showing desks of the staff of an office and the like is displayed, and camera icons 142-1 to 142-7 respectively indicating the camera positions are displayed over the layout. The camera icons 142-1 to 142-7 are displayed in directions substantially the same as those of corresponding cameras.

In video-image window 144, an output video image from a selected camera is displayed. Note that on the layout window 140, to identify the selected camera, the camera icon corresponding to the selected camera is displayed in a color different from that of the other camera icons corresponding to unselected cameras.

An operation panel 146 is displayed below the camera video-image window 144. The operation panel 146 has rotation buttons for panning and tilting, and sliding-type buttons for zooming. By manipulating these buttons, rotation and/or zooming of an arbitrary selected camera can be made. In a case where the selected camera is not operable, the display status of the rotation buttons and the zoom buttons changes into display status indicative of inoperable status of the camera. In a current value display window 148, the current values (position, pan-angle, tilt-angle and zoom value) of the selected camera are displayed.

Figure 23:
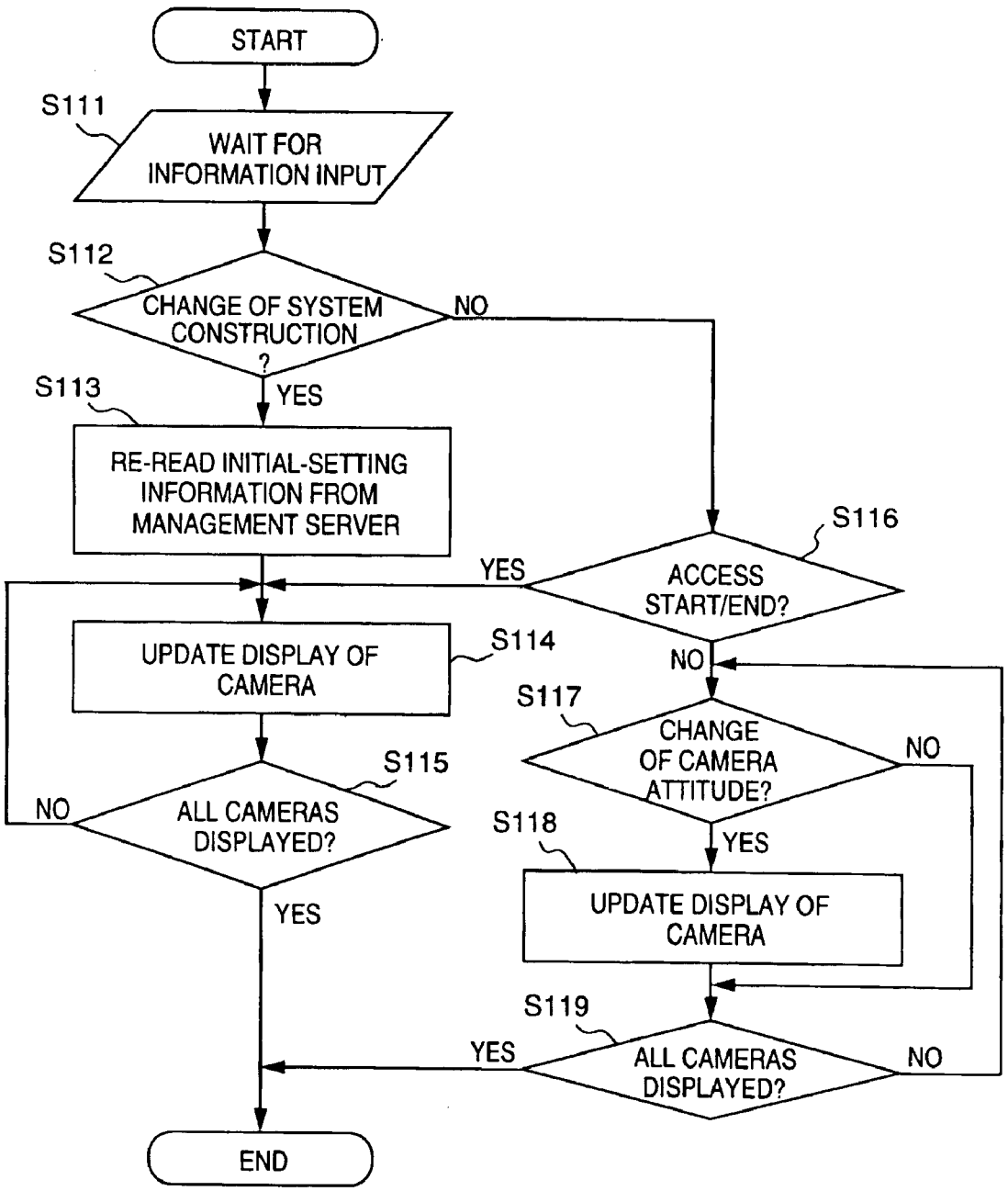
FIG. 23 is a flowchart showing camera-information update processing.

Next, the display of the notification information from the camera management server 68 when the user interface in FIG. 22 is employed will be described with reference to FIG. 23.

After the activation of the camera control client 72, it always monitors the buffer of the channel on which the system information is inputted via the network interface 36 (S111). When there is any input in the buffer, the camera control client 72 reads the input as notification information, and operates as follows in accordance with necessity.

If it is found that the system construction has been changed (S112), e.g., a new camera has been added to the system, the camera control client 72 requires the camera management server 68 for the camera initial-setting information (S113). Then, the camera control client 72 adds the obtained camera initial-setting information and the notification information, and displays the information on the layout window 140 (S114 and S115).

If it is found that a camera has been removed from the system, the camera control client 72 deletes the information on the removed camera from the camera list, and deletes the corresponding camera icon on the layout window 140.

If new camera access has started or camera access has ended (S116), the camera control client 72 updates the display of the corresponding camera on the camera window 140 (S114). The camera control client 72 held in each computer displays three types of cameras, camera(s) accessed by the user of the computer, camera(s) accessed by another user and unaccessed camera(s), in different display statuses, e.g., different display colors for easy visual discrimination.

If it is found that the camera-access direction of a currently displayed camera has been changed (S117), the camera control client 72 changes the information on the direction and displays the information again (S118 and S119).

Figure 24:
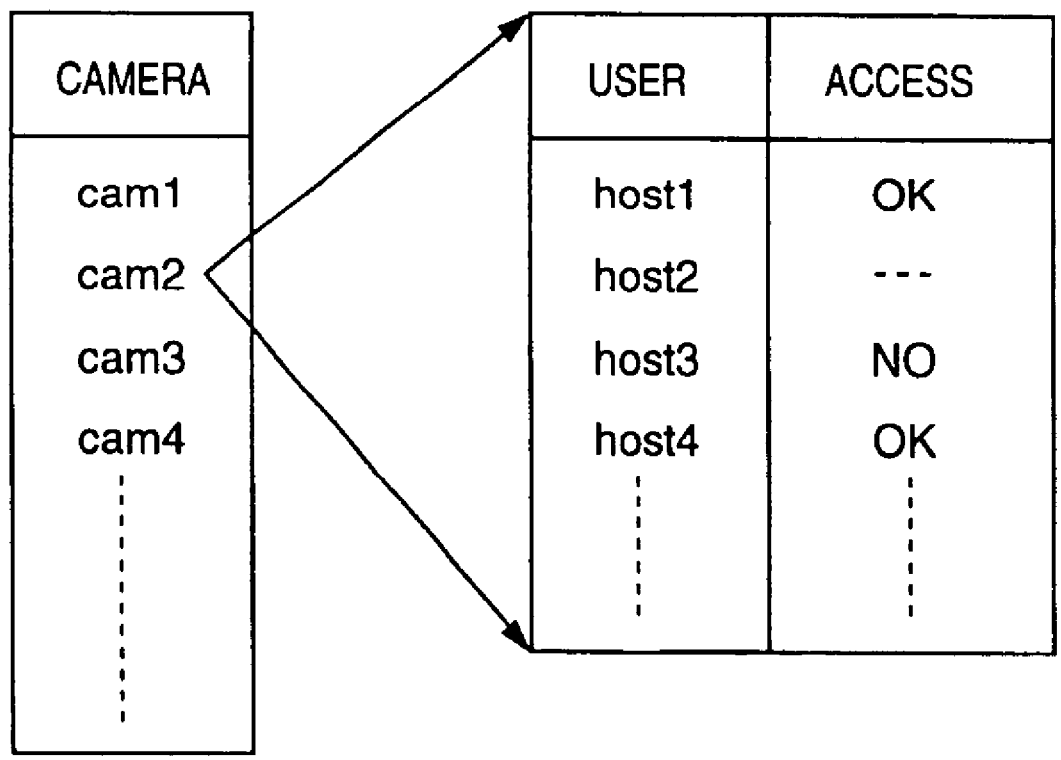
FIG. 24 is an explanatory view of camera access assignment data.

The camera management server 68 can manages access right of the cameras. The access right is right to remote operate a desired camera. The camera management server 68 has a table of access information for each camera, as shown in FIG. 24. When a user requires access to a camera, the camera management server 68 confirms whether or not the user has acquired the access right to the camera, and if the user has the access right and no other user can use (remote-operates) the camera, allows the user to operate the camera.

The access right is not fixed, but the owners of respective cameras or an authorized system manager can change the content or level of the access right. In such case, an access-right change button may be provided on the camera operation panel so that the owner or system manager can allow an arbitrary user to access the camera connected to the own work station, otherwise cancel the allowance.

To notify the users of the accessibility status of the cameras, e.g., camera icon(s) of accessible camera(s) and camera icon(s) of inaccessible camera(s) may be displayed in different chroma or lightness values. This display method to change representation of gradation or color difference is well-known.

As described above, as the notification information of the camera management server 68 includes access-right information, even when the access right information of a camera is changed by another user, the changed result can be displayed immediately for all the users.

As it is explained in the above description, in a case where a plurality of cameras are controlled by a plurality of users, all the users can obtain the information on the entire system in a real time manner. Further, visual display provides a intuitive user interface.

The present invention is not limited to the above embodiments and various changes and modifications can be made within the spirit and scope of the present invention. Therefore, to apprise the public of the scope of the present invention, the following claims are made.

What is claimed is:

1. A monitoring terminal for monitoring an image picked up by a camera connected to a network, comprising:

obtaining device arranged to obtain information concerning parameters of said camera including unchanging parameters and parameters whose conditions are changed by user's operation in accordance with starting up said monitoring terminal and obtaining information concerning said parameters whose conditions are changed by user's operation except for said unchanging parameters of the initial parameters of said camera after the initial start up; and display device arranged to display camera-status on the basis of the parameters of said camera which is obtained by the obtaining device, wherein said display device displays a pan angle by a direction of a camera symbol.

2. The terminal according to claim 1, wherein if a predetermined camera is used by another user, said display device displays a symbol of said predetermined camera in a color different from that of other cameras.

3. The terminal according to claim 1, wherein if registration of a new camera is informed on the system, said display device displays a camera symbol of the new camera on a layout, while if a camera is disconnected, said display device deletes the camera symbol of the camera on the layout.

4. The terminal according to claim 1, wherein said display device displays, if a predetermined camera is unavailable, a symbol of said predetermined camera so as to indicate responseless status.

5. The terminal according to claim 1, wherein said display device displays a layout and camera symbol representing a predetermined camera over the layout on the basis of the parameters, said predetermined camera with the camera symbol.

6. The terminal according to claim 1, wherein said display device displays a status of connection of the camera apparatus and the network.

7. The terminal according to claim 1, wherein said display device displays the image picked up by a predetermined camera on the same screen simultaneously as the screen on which the status of said predetermined camera is displayed.

8. The terminal according to claim 1, wherein said display device further displays starting and ending of operation of a predetermined camera.

9. The terminal according to claim 1, wherein said obtaining device periodically obtains information concerning parameters of a predetermined camera whose condition changes subsequent to the initial start up.

10. A method for monitoring an image picked up by a camera connected to a network, comprising the steps of:
obtaining information concerning parameters of said camera including unchanging parameters and parameters whose conditions are changed by user's operation in accordance with starting up a monitoring terminal and obtaining information concerning said parameters whose conditions are changed by user's operation except for said unchanging parameters of the initial parameters of said camera after the initial startup;
displaying on a screen, the camera-status on the basis of the parameters of said camera which are obtained by the obtaining step; and
displaying a pan angle by a direction of a camera symbol.

11. The method according to claim 10, wherein, if a predetermined camera is used by another user, said method further comprises the step of displaying the symbol of said predetermined camera in a color different from that of other cameras.

12. The method according to claim 10, wherein if a new camera is registered, said method further comprises the step of displaying a camera symbol of the new camera and if a camera is disconnected, said method deletes the camera symbol of the disconnected camera.

13. The method according to claim 10, wherein said method further comprises the step of displaying, if a predetermined camera is unavailable, a symbol of said predetermined camera so as to indicate responseless status.

14. The method according to claim 10, further comprising the steps of:
displaying camera symbols representing a predetermined camera over a layout; and
displaying the camera-status of said predetermined camera with the camera symbol.

15. The method according to claim 10, wherein said step of obtaining comprises periodically obtaining information concerning parameters of a predetermined camera whose condition changes subsequent to the initial startup.

16. The method according to claim 10, further comprising the step of:
displaying the image picked up by a predetermined camera on the same screen simultaneously as the screen on which the status of said predetermined camera is displayed.

17. The method according to claim 10, wherein said method further comprises the step of displaying a status of connection of a predetermined camera and the network.

18. The method according to claim 10, wherein said method further comprises the step of displaying starting and ending of operation of a predetermined camera connected to the network.

19. The method according to claim 10, wherein said step of obtaining further comprises periodically obtaining information concerning parameters of a predetermined camera whose condition changes after said predetermined camera is started up.

20. A computer readable medium of monitoring terminals for monitoring an image picked up by a camera having computer usable program said program comprising the steps of:
obtaining information concerning parameters of said camera including unchanging parameters and parameters whose conditions are changed by user's operation connected to a network in accordance with starting up said monitoring terminal and obtaining information concerning said parameters whose conditions are changed by user's operation except for said unchanging parameters of the initial parameters of said camera after the initial startup;
displaying on a screen, the camera status on the basis of the parameters of said camera; and
displaying a pan angle by a direction of a camera symbol.

21. The computer readable medium according to claim 20, wherein said program comprises the step of displaying the symbol of a predetermined camera in a color different from that of other cameras if said predetermined camera is used by another user.

22. The computer readable medium according to claim 20, wherein said program further comprises the step of displaying, if a new camera is registered, a camera symbol of the new camera and if a camera is disconnected, a camera symbol of the disconnected camera.

23. The computer readable medium according to claim 20, wherein said program further comprises the step of displaying a symbol of an unavailable camera so as to indicate responseless status.

24. The computer readable medium according to claim 20, wherein said program further comprises the steps of:
displaying camera symbols representing a predetermined camera over a layout displayed on a screen; and
displaying the camera-status of said predetermined camera with the camera symbols.

25. The computer readable medium according to claim 20, wherein said step of obtaining comprises periodically obtaining information concerning parameters of a predetermined camera whose condition changes subsequent to the initial startup.

26. The computer readable medium according to claim 20, wherein said program comprises the step of:
displaying the image picked up by a predetermined camera on the same screen simultaneously as the screen on which the status of said predetermined camera is displayed.

27. The computer readable medium according to claim 20, wherein said program further comprises the step of displaying display statuses of connection of said predetermined camera and the network.

28. The computer readable medium according to claim 20, wherein said program further comprises the step of displaying starting and ending of operation of the camera apparatuses connected to the network.

29. The computer readable medium according to claim 20, wherein said step of obtaining further comprises periodically obtaining information concerning a status of cameras whose conditions changes subsequent to the initial startup.

30. The terminal as in claim 2, wherein said predetermined camera is said camera.

31. The terminal as in claim 4, wherein said predetermined camera is said camera.

32. The terminal as in claim 6, wherein said predetermined camera is said camera.

33. The terminal as in claim 7, wherein said predetermined camera is said camera.

34. The terminal as in claim 8, wherein said predetermined camera is said camera.

35. The terminal as in claim 9, wherein said predetermined camera is said camera.

36. The terminal as in claim 11, wherein said predetermined camera is said camera.

37. The terminal as in claim 13, wherein said predetermined camera is said camera.

38. The terminal as in claim 14, wherein said predetermined camera is said camera.

39. The terminal as in claim 15, wherein said predetermined camera is said camera.

40. The terminal as in claim 16, wherein said predetermined camera is said camera.

41. The terminal as in claim 17, wherein said predetermined camera is said camera.

42. The terminal as in claim 18, wherein said predetermined camera is said camera.

43. The terminal as in claim 19, wherein said predetermined camera is said camera.

44. The terminal as in claim 21, wherein said predetermined camera is said camera.

45. The terminal as in claim 24, wherein said predetermined camera is said camera.

46. The terminal as in claim 25, wherein said predetermined camera is said camera.

47. The terminal as in claim 26, wherein said predetermined camera is said camera.

48. A method for monitoring an image picked up by a camera connected to a network, comprising the steps of:
   obtaining information concerning parameters of said camera including unchanging parameters and parameters whose conditions are changed by user's operation in accordance with starting up a setting operation of said camera and obtaining information concerning said parameters whose conditions are changed by user's operation except for said unchanging parameters of the initial parameters of said camera after the starting up;
   displaying on screen, the camera-status on the basis of the parameters of said camera which is obtained in said obtaining step; and
   displaying a pan angle by a direction of a camera symbol.

49. The method according to claim 48, wherein if a predetermined camera is used by another user, said method further comprises the stop of displaying the symbol of said predetermined camera in a color different from that of other cameras.

50. The method according to claim 48, wherein if a new camera is registered, said method further comprises the step of displaying a camera symbol of the new camera and if a camera is disconnected, said method deletes the camera symbol of the disconnected camera.

51. The method according to claim 48, wherein said method further comprises the step of displaying, if a predetermined camera is unavailable, a symbol of said predetermined camera so as to indicate responseless status.

52. The method according to claim 48, further comprising the steps of:
   displaying camera symbols representing a predetermined camera over a layout; and
   displaying the camera-status of said predetermined camera with the camera symbol.

53. The method according to claim 48, wherein said step of obtaining comprises periodically obtaining information concerning parameters of a predetermined camera whose condition changes subsequent to the starting up.

54. The method according to claim 48, further comprising the step of:
   displaying the image picked up by a predetermined camera on the same screen simultaneously as the screen on which the status of said predetermined camera is displayed.

55. The method according to claim 48, wherein said method further comprises the step of displaying a status of connection of a predetermined camera and the network.

56. The method according to claim 48, wherein said method further comprises the step of displaying starting and ending of operation of a predetermined camera connected to the network.

57. The method according to claim 48, wherein the setting operation of said camera is started up in response to a user's designation.

58. A monitoring terminal for monitoring an image picked up by a camera connected to a network, comprising:
   obtaining device arranged do obtain information concerning parameters of said camera including unchanging parameters and parameters whose conditions are changed by user's operation in accordance with starting up a setting operation of said camera and obtaining information concerning said parameters whose conditions are changed by user's operation except for said unchanging parameters of the initial parameters of said camera after the initial start up; and
   display device arranged to display camera-status on the basis of the parameters of said camera which is obtained by the obtaining device, wherein said display device displays a pan angle by a direction of a camera symbol.

59. A computer readable medium of monitoring terminals for monitoring an image picked up by a camera having computer usable program said program comprising the steps of:
   obtaining information concerning parameters of said camera including unchanging parameters and parameters whose conditions are changed by user's operation in accordance with starting up a setting operation of said camera and obtaining information concerning said parameters whose conditions are changed by user's operation except fur said unchanging parameters of the initial parameters of said camera after the starting up;
   displaying on screen, the camera status on the basis of the parameters of said camera which is obtained in said obtaining step; and
   displaying a pan angle by a direction of a camera symbol.

60. A method for monitoring an image pieced rip by a camera connected to a network, comprising the steps of:
   obtaining information concerning parameters of said camera including unchanging parameters and parameters whose conditions are changed by user's operation in accordance with a map displaying operation of said camera and obtaining information concerning said parameters whose conditions are changed by user's operation except for said unchanging parameters of the initial parameters of said camera after the map displaying operation;

displaying on screen the camera-status on the basis of the parameters of said camera which is obtained in the obtaining stop, and displaying a pan angle by a direction of a camera symbol on the map.

61. The method according to claim 60, wherein if a predetermined camera is used by another user, said method further comprises the step of displaying the symbol of a predetermined camera in a color different from that of other cameras.

62. The method according to claim 60, wherein the map displaying operation of said camera is executed in response to an user's designation.

63. A monitoring terminal for monitoring an image picked up by a camera connected to a network, comprising:

obtaining device arranged to obtain information concerning parameters of said camera including unchanging parameters and parameters whose conditions are changed by user's operation in accordance with a map displaying operation of said camera and obtaining information concerning said parameters whose conditions are changed by user's operation except for said unchanging parameters of the initial parameters of said camera after the map displaying operation; and display device arranged to display camera-status on the basis of the parameters of said camera which is obtained by the obtaining device, wherein said display device displays a pan angle by a direction of a camera symbol on the map.

64. A computer readable medium of monitoring terminals for monitoring an image picked up by a camera having computer usable program said program comprising the steps of:

obtaining information concerning parameters of said camera including unchanging parameters and parameters whose conditions are changed by user's operation in accordance with a map displaying operation of said camera and obtaining Information concerning said parameters whose conditions are changed by user's operation except for said unchanging parameters of the initial parameters of said camera after the map displaying operation;

displaying on screen the camera-status on the basis of the parameters of said camera which is obtained in the obtaining step, and displaying a pan angle by a direction of a camera symbol on the map.

65. A method for monitoring an image picked up by a camera connected to a network, comprising the steps of:

obtaining information concerning parameters of said camera, including unchanging parameters and parameters whose conditions are changed by user's operation in accordance with a camera symbol displaying operation and obtaining information concerning said parameters, whose conditions are changed by user's operation except far said unchanging parameters of the initial parameters of said camera after the camera symbol displaying operation;

displaying camera-status on the basis of the parameters of said camera which is obtained in the obtaining step, and displaying a pan angle by a direction of a camera symbol.

66. The method according to claim 65, wherein if a predetermined camera is used by another user, said method further comprises the step of displaying the symbol of a predetermined camera in a color different from that of other cameras.

67. The method according to claim 65, wherein the camera symbol displaying operation is executed in response to an user's designation.

68. A monitoring terminal for monitoring an image picked up by a camera connected to a network, comprising:

obtaining device arranged to obtain information concerning parameters of said camera including unchanging parameters and parameters whose conditions are changed by user's operation in accordance with a camera symbol displaying operation and obtaining information concerning said parameters whose conditions are changed by user's operation except for said unchanging parameters of the initial parameters of said camera after the camera symbol displaying operation; and display device arranged to display camera-status on the basis of the parameters of said camera which is obtained by the obtaining device, wherein said display device displays a pan angle by a direction of a camera symbol on the map.

69. A computer readable medium of monitoring terminals for monitoring an image picked up by a camera having computer usable program said program comprising the steps of obtaining information concerning parameters of said camera including unchanging parameters and parameters whose conditions are changed by user's operation in accordance with a camera symbol displaying operation and obtaining Information concerning said parameters whose conditions are changed by user's operation except for said unchanging parameters of the initial parameters of said camera after the camera symbol displaying operation;

displaying camera-status on the basis of the parameters of said camera which is obtained in the obtaining step; and displaying a pan angle by a direction of a camera symbol.

* * * * *

UNITED STATES PATENT AND TRADEMARK OFFICE
CERTIFICATE OF CORRECTION

PATENT NO. : 7,116,357 B1 Page 1 of 1
APPLICATION NO. : 08/615876
DATED : October 3, 2006
INVENTOR(S) : Oya et al.

It is certified that error appears in the above-identified patent and that said Letters Patent is hereby corrected as shown below:

In the Specification:

In col. 8, line 34, please replace "camera 5" to --camera--.

In the Claims:

In claim 27 (col. 16, lines 60-61), please replace "claim 20" with --claim 26--.

In claim 28 (col. 16, line 64-65), please replace "claim 20" with --claim 26--.

In claim 29 (col. 17, line 2), please replace "claim 20" with --claim 26--.

In claim 32 (col. 17, line 10), please replace "claim 6" with --claim 5--.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,116,357 B1 |
| APPLICATION NO. | : 08/615876 |
| DATED | : October 3, 2006 |
| INVENTOR(S) | : Oya et al. |

It is certified that error appears in the above-identified patent and that said Letters Patent is hereby corrected as shown below:

On the Title page of the issued patent

In the References Cited (56), Please add the following references:

U.S. PATENT DOCUMENTS

| | | |
|---|---|---|
| 6,313,875 B1 | 11/2001 | Suga et al. |
| 6,665,004 B1 | 12/2003 | Paff |

FOREIGN PATENT DOCUMENTS

| | | |
|---|---|---|
| JP | A 5-094418 | 4/1993 |
| JP | A 6-139247 | 5/1994 |
| JP | A 7-135594 | 5/1995 |
| WO | WO 93/06690 | 4/1993 |

In the Specification:

In col. 8, line 34, please replace "camera 5" to --camera--.

UNITED STATES PATENT AND TRADEMARK OFFICE
CERTIFICATE OF CORRECTION

PATENT NO. : 7,116,357 B1
APPLICATION NO. : 08/615876
DATED : October 3, 2006
INVENTOR(S) : Oya et al.

It is certified that error appears in the above-identified patent and that said Letters Patent is hereby corrected as shown below:

In the Claims:

In claim 27, (col. 16, lines 60-61), please replace "claim 20" with --claim 26--.

In claim 28 (col. 16, line 64-65), please replace "claim 20" with --claim 26--.

In claim 29 (col. 17, line 2), please replace "claim 20" with --claim 26--.

In claim 32 (col. 17, line 10), please replace "claim 6" with --claim 5--.

Signed and Sealed this

Second Day of January, 2007

JON W. DUDAS
*Director of the United States Patent and Trademark Office*